(12) United States Patent
Geng et al.

(10) Patent No.: US 12,147,017 B2
(45) Date of Patent: Nov. 19, 2024

(54) OPTICAL IMAGING LENS ASSEMBLY

(71) Applicant: ZHEJIANG SUNNY OPTICS CO., LTD., Zhejiang (CN)

(72) Inventors: Xiaoting Geng, Zhejiang (CN); Jin Zhou, Zhejiang (CN); Li Xie, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 506 days.

(21) Appl. No.: 17/562,043

(22) Filed: Dec. 27, 2021

(65) Prior Publication Data
US 2022/0214525 A1    Jul. 7, 2022

(30) Foreign Application Priority Data

Jan. 7, 2021    (CN) .......................... 202110017743.X

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01)

(58) Field of Classification Search
CPC ............................. G02B 13/0045; G02B 9/64
See application file for complete search history.

(56) References Cited

U.S. PATENT DOCUMENTS

| | | | |
|---|---|---|---|
| 10,558,009 B2 | 2/2020 | Chang et al. | |
| 11,531,187 B2* | 12/2022 | Geng | G02B 9/64 |
| 11,531,189 B2* | 12/2022 | Ye | G02B 9/64 |
| 11,579,406 B2* | 2/2023 | Chen | G02B 13/18 |
| 2019/0243106 A1 | 8/2019 | Xu et al. | |
| 2019/0324232 A1 | 10/2019 | Yang et al. | |
| 2020/0003995 A1* | 1/2020 | Jung | G02B 9/64 |
| 2020/0371316 A1 | 11/2020 | Wang et al. | |

* cited by examiner

*Primary Examiner* — Christopher Stanford
*Assistant Examiner* — Journey F Sumlar
(74) *Attorney, Agent, or Firm* — Samson G. Yu

(57) ABSTRACT

The disclosure provides an optical imaging lens assembly, which sequentially includes from an object side to an image side along an optical axis: a first lens with a positive refractive power; a second lens with a refractive power; a third lens with a refractive power; a fourth lens with a refractive power; a fifth lens with a refractive power, an object-side surface thereof is a convex surface, and an image-side surface thereof is a concave surface; a sixth lens with a positive refractive power, an object-side surface thereof is a convex surface, and an image-side surface thereof is a concave surface; a seventh lens with a negative refractive power; wherein an on-axis distance TTL from an object-side surface of the first lens to an imaging surface and a half of a diagonal length ImgH of an effective pixel region on the imaging surface satisfy: TTL/ImgH<1.25.

20 Claims, 13 Drawing Sheets

OPTICAL IMAGING LENS ASSEMBLY

CROSS-REFERENCE TO RELATED APPLICATION(S)

The disclosure claims priority to and the benefit of Chinese Patent Present invention No. 202110017743.X, filed in the China National Intellectual Property Administration (CNIPA) on 7 Jan. 2021, which is incorporated herein by reference in its entirety.

TECHNICAL FIELD

The disclosure relates to the technical field of optical imaging, and in particular to an optical imaging lens assembly with seven lenses.

BACKGROUND

With the increasing demand for camera phones, the quality of mobile phone lenses has become an important measurement index of the quality of mobile phones. Recently, the trend of ultra-thinness of the mobile phone is becoming more and more obvious with the market demand and the continuous upgrading of module technology, among which the requirements for the imaging quality of mobile phone lens are getting higher and higher. Having extremely high mobile phone pixels and top-notch image processing functions has become an essential function of an excellent mobile phone. Just from the view of the mobile phone lens, it has become an inevitable trend to have higher imaging quality and smaller lens group size.

However, the traditional lens with better imaging quality usually has a larger structural size, and reducing the structural size of the lens by conventional means usually comes at the expense of the imaging quality of the lens. Therefore, how to improve the imaging quality of the lens while reducing the size structure has become a major problem faced by the mobile phone lens recently.

SUMMARY

Some embodiments of the disclosure provide an imaging lens with seven lenses, which has a good imaging effect, meanwhile, its ultra-thin characteristics can provide enough space, so that the related structure and assembly process are more flexible without reducing excessive imaging quality.

An embodiment of the disclosure provides an optical imaging lens assembly, which sequentially includes from an object side to an image side along an optical axis: a first lens with a positive refractive power; a second lens with a refractive power; a third lens with a refractive power; a fourth lens with a refractive power; a fifth lens with a refractive power, an object-side surface thereof is a convex surface, and an image-side surface thereof is a concave surface; a sixth lens with a positive refractive power, an image-side surface thereof is a convex surface, and an image-side surface thereof is a concave surface; and a seventh lens with a negative refractive power; wherein TTL is an on-axis distance from an object-side surface of the first lens to an imaging surface, ImgH is a half of a diagonal length of an effective pixel region on the imaging surface, TTL and ImgH satisfy: TTL/ImgH<1.25.

In an implementation mode, an effective focal length f of the optical imaging lens assembly and a maximum field of view FOV of the optical imaging lens assembly satisfy: 4.8 mm<f×tan(½FOV)<6.5 mm.

In an implementation mode, an effective focal length f of the optical imaging lens assembly and an Entrance Pupil Diameter (EPD) of the optical imaging lens assembly satisfy: f/EPD<1.9.

In an implementation mode, an effective focal length f6 of the sixth lens, a curvature radius R12 of the image-side surface of the sixth lens and a curvature radius R11 of the object-side surface of the sixth lens satisfy: 0.7<f6/(R11+R12)<1.5.

In an implementation mode, an effective focal length f4 of the fourth lens and an effective focal length f1 of the first lens satisfy: 2.2<f4/f1<3.2.

In an implementation mode, an effective focal length f3 of the third lens and an effective focal length f7 of the seventh lens satisfy: 1.0<(f3+f7)/(f3−f7)<1.5.

In an implementation mode a curvature radius R4 of an image-side surface of the second lens, a curvature radius R3 of an object-side surface of the second lens, a curvature radius R2 of an image-side surface of the first lens and a curvature radius R1 of an object-side surface of the first lens satisfy: 1.5<(R3+R4)/(R1+R2)<2.0.

In an implementation mode, a curvature radius R10 of the image-side surface of the fifth lens and a curvature radius R9 of the object-side surface of the fifth lens satisfy: 0.8<R9/R10<1.3.

In an implementation mode, a curvature radius R14 of an image-side surface of the seventh lens, a curvature radius R13 of an object-side surface of the seventh lens and a center thickness CT7 of the seventh lens on the optical axis satisfy: 1.7<(R13+R14)/CT7<3.4.

In an implementation mode, an air space T67 between the sixth lens and the seventh lens on the optical axis, and a center thickness CT6 of the sixth lens on the optical axis satisfy: 2.0<T67/CT6<2.8.

In an implementation mode, a combined focal length f12 of the first lens and the second lens, a center thickness CT1 of the first lens on the optical axis and a center thickness CT2 of the second lens on the optical axis satisfy: 6.6<f12/(CT1+CT2)<8.6.

In an implementation mode, SAG51 is an on-axis distance between an intersection point of the object-side surface of the fifth lens and the optical axis and an effective radius vertex of the object-side surface of the fifth lens, SAG52 is an on-axis distance between an intersection point of the image-side surface of the fifth lens and the optical axis and an effective radius vertex of the image-side surface of the fifth lens, SAG41 is an on-axis distance between an intersection point of an object-side surface of the fourth lens and the optical axis and an effective radius vertex of the object-side surface of the fourth lens, and SAG42 is an on-axis distance between an intersection point of an image-side surface of the fourth lens and the optical axis and an effective radius vertex of the image-side surface of the fourth lens, and SAG51, SAG52, SAG41 and SAG42 satisfy: 1.7<(SAG51+SAG52)/(SAG41+SAG42)<2.5.

In an implementation mode, SAG71 is an on-axis distance between an intersection point of an object-side surface of the seventh lens and the optical axis and an effective radius vertex of the object-side surface of the seventh lens, SAG61 is an on-axis distance between an intersection point of the object-side surface of the sixth lens and the optical axis and an effective radius vertex of the object-side surface of the sixth lens, and SAG71 and SAG61 satisfy: 1.6<SAG71/SAG61<2.3.

Another embodiment of the disclosure provides an optical imaging lens assembly, which sequentially includes from an object side to an image side along an optical axis: a first lens with a positive refractive power; a second lens with a refractive power; a third lens with a refractive power; a fourth lens with a refractive power; a fifth lens with a refractive power, an object-side surface thereof is a convex surface, and an image-side surface thereof is a concave surface; a sixth lens with a positive refractive power, an object-side surface thereof is a convex surface, and an image-side surface thereof is a concave surface; and a seventh lens with a negative refractive power; wherein an effective focal length f of the optical imaging lens assembly and a maximum field of view FOV of the optical imaging lens assembly satisfy: 4.8 mm<f×tan(½FOV)<6.5 mm.

The disclosure has the following beneficial effects:

The optical imaging lens assembly provided by the disclosure includes multiple lenses, such as the first lens to the seventh lens. By reasonably controlling TTL/ImgH, the size of the lens group can be effectively reduced, and by the positive refractive power of the first lens and the negative refractive power of the seventh lens, the aberration of the edge field of view can be effectively reduced while the luminous flux is increased, meanwhile, the positive refractive power of the sixth lens will be beneficial to the distribution of the refractive power of the whole lens group, avoid excessive concentration of the refractive power, and help the lens group to balance the chromatic lateral aberration and the lateral chromatic aberration. And by controlling the range of TTL/ImgH<1.25, the total length of the system can be effectively controlled, and the characteristics of ultra-thin can be ensured, so that the lens group can be better applied to more and more ultra-thinned electronic products on the market.

BRIEF DESCRIPTION OF THE DRAWINGS

In order to describe the technical solutions in the embodiments of the disclosure more clearly, the following briefly describes the accompanying drawings required for describing the embodiments of the disclosure. Apparently, the accompanying drawings in the following description only show some embodiments of the disclosure, and those skilled in the art may still derive other drawings from these accompanying drawings without creative efforts.

DETAILED DESCRIPTION OF THE EMBODIMENTS

Figure 1:
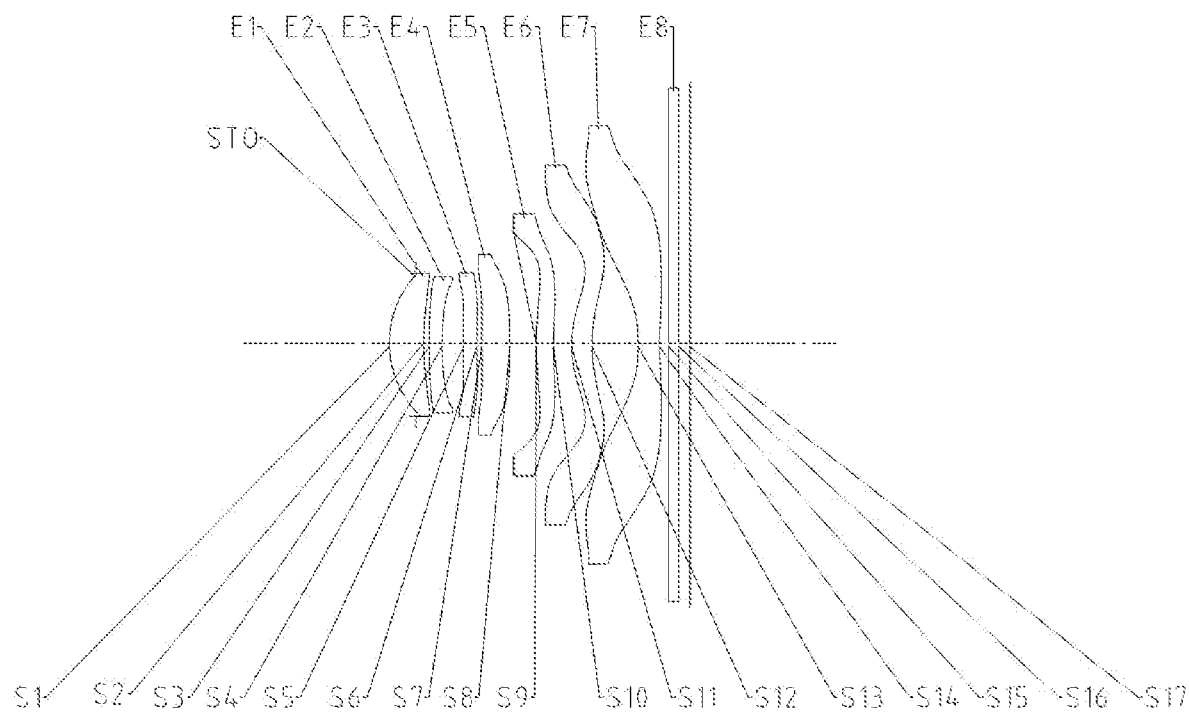
FIG. 1 shows a structural schematic diagram of the lens group of an optical imaging lens assembly according to Embodiment 1 of the disclosure.

The following clearly and completely describes the technical solutions in the embodiments of the disclosure with reference to the accompanying drawings in the embodiments of the disclosure, apparently, the described embodiments are only some but not all of the embodiments of the disclosure. All other embodiments obtained by the ordinary skill person in the art based on the embodiments of the disclosure without creative efforts shall fall within the protection scope of the disclosure.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

Unless otherwise defined, all terms (including technical terms and scientific terms) used in the disclosure have the same meanings as commonly understood by those of ordinary skill in the art of the disclosure. It should also be understood that the terms (for example, terms defined in a common dictionary) should be explained to have the same meanings as those in the context of a related art and may not be explained with ideal or excessively formal meanings, unless clearly defined like this in the disclosure.

It is to be noted that the embodiments in the disclosure and characteristics in the embodiments may be combined without conflicts. The characteristics, principles and other aspects of the disclosure will be described below with reference to the drawings and in combination with the embodiments in detail.

Exemplary Embodiments

The optical imaging lens assembly according to an exemplary embodiment of the disclosure includes seven lenses, which sequentially includes from an object side to an image side along an optical axis: a first lens, a second lens, a third lens, a fourth lens, a fifth lens, a sixth lens and a seventh lens, wherein, each lens is independent of each other, and there is an air space between each lens on the optical axis.

In an exemplary embodiment, the first lens has a positive refractive power; the second lens has a positive refractive power or a negative refractive power; the third lens has a positive refractive power or a negative refractive power; the fourth lens has a positive refractive power or a negative refractive power; the fifth lens has a positive refractive power or a negative refractive power, an object-side surface thereof is a convex surface, and an image-side surface thereof is a concave surface; the sixth lens has a positive refractive power, an object-side surface thereof is a convex surface, and an image-side surface thereof is a concave surface; and the seventh lens has a negative refractive power. Reasonable matching of the refractive power and surface shapes of each lens in the optical imaging system is not only conducive to a rationality of the structure of the optical imaging lens assembly, but also conducive to a ultra-clear photographing function of the lens and reducing the system tolerance sensitivity.

In an exemplary embodiment, TTL is an on-axis distance from an object-side surface of the first lens to an imaging surface, ImgH is a half of a diagonal length of an effective pixel region on the imaging surface, TTL and ImgH satisfy the following condition: TTL/ImgH<1.25. A smaller compression ratio of a total length of structure of a wide-angle lens and an image surface can be achieved, a ultra-thin design effect is achieved, which is beneficial to a miniaturization of the system. More specifically, TTL and ImgH satisfy: $1.12 \leq TTL/ImgH \leq 1.21$.

In an exemplary embodiment, an effective focal length f of the optical imaging lens assembly and a maximum field of view FOV of the optical imaging lens assembly satisfy: 4.8 mm<f×tan(½FOV)<6.5 mm. By controlling the effective focal length and FOV of the optical imaging lens assembly, an image height of the system can be improved and an aberration of an large edge field of view can be avoided, which is helpful to better maintain the characteristics of wide imaging range and high imaging quality of the system. More specifically, $4.95 \text{ mm} \leq f \times \tan(\frac{1}{2}FOV) \leq 6.01$ mm.

In an exemplary embodiment, an effective focal length f of the optical imaging lens assembly and an Entrance Pupil Diameter (EPD) of the optical imaging lens assembly satisfy: f/EPD<1.9. By controlling a ratio range of the effective focal length f of the optical imaging lens assembly to the Entrance Pupil Diameter (EPD) of the optical imaging lens assembly, a luminous flux of the lens can be effectively increased, a relative illumination is high, an imaging quality of the lens in the darker environment can be well improved, and customers can have a better experience in the dark environment. More specifically, $1.74 \leq f/EPD \leq 1.87$.

In an exemplary embodiment, an effective focal length f6 of the sixth lens, a curvature radius R12 of the image-side surface of the sixth lens and a curvature radius R11 of the object-side surface of the sixth lens satisfy: 0.7<f6/(R11+R12)<1.5. By controlling the effective focal length of the sixth lens and a curvature radius of the image-side surface of the object-side surface of the sixth lens, a total large aperture effect can be improved, and a field curvature and a chromatic aberration can be avoided, meanwhile, an astigmatism and a spherical aberration are not easily generated. More specifically, $0.75 \leq f6/(R11+R12) \leq 1.37$.

In an exemplary embodiment, an effective focal length f4 of the fourth lens and an effective focal length f1 of the first lens satisfy: 2.2<f4/f1<3.2. By reasonably adjusting the effective focal length of the first lens and the fourth lens, not only can the refractive power of the lens group be distributed more reasonably, which is not excessively concentrated on the fourth lens, and is conducive to improving an imaging quality of the system and reducing a sensitivity of the system, but also can keep the ultra-thin characteristics of the lens group. More specifically, $2.36 \leq f4/f1 \leq 3.00$.

In an exemplary embodiment, an effective focal length f3 of the third lens and an effective focal length f7 of the seventh lens satisfy: 1.0<(f3+f7)/(f3−f7)<1.5. By reasonably distributing the effective focal length of the third lens and the effective focal length of the seventh lens, a size of the lens group can be shortened more effectively, so that the ultra-thin characteristics can be maintained, the excessive concentration of the refractive power of the system can be avoided, and the system aberration can be better corrected by matching 2.2<f4/f1<3.2. More specifically, $1.26 \leq (f3+f7)/(f3−f7) \leq 1.31$.

In an exemplary embodiment, a curvature radius R4 of an image-side surface of the second lens, a curvature radius R3 of an object-side surface of the second lens, a curvature radius R2 of an image-side surface of the first lens and a curvature radius R1 of an object-side surface of the first lens satisfy: 1.5<(R3+R4)/(R1+R2)<2.0. By reasonably distributing the curvature radius of an object-side surface of the first lens, the curvature radius of the object-side surface and the image-side surface of the second lens, it will help to balance various aberrations of the system, correct the aberrations of the system and improve the imaging quality of the lens group. More specifically, $1.53 \leq (R3+R4)/(R1+R2) \leq 1.96$.

In an exemplary embodiment, a curvature radius R10 of the image-side surface of the fifth lens and a curvature radius R9 of the object-side surface of the fifth lens satisfy: 0.8<R9/R10<1.3. Controlling the curvature radius of the image-side surface of the fifth lens and the curvature radius of the object-side surface of the fifth lens is helpful to increase a subject space, reduce an aberration of the edge field of view and improve an image quality. More specifically, $0.95 \leq R9/R10 \leq 1.20$.

In an exemplary embodiment, a curvature radius R14 of an image-side surface of the seventh lens, a curvature radius R13 of an object-side surface of the seventh lens and a center thickness CT7 of the seventh lens on the optical axis satisfy: 1.7<(R13+R14)/CT7<3.4. By reasonably controlling the curvature radius of the object-side surface and the image-side surface of the seventh lens and the center thickness of the seventh lens on the optical axis, an astigmatism and a coma of the seventh lens can be effectively balanced. More specifically, $1.82 \leq (R13+R14)/CT7 \leq 3.21$.

In an exemplary embodiment, an air space T67 between the sixth lens and the seventh lens on the optical axis and a center thickness CT6 of the sixth lens on the optical axis satisfy: $2.0<T67/CT6<2.8$. By controlling the air space between the sixth lens and the seventh lens on the optical axis and the center thickness of the sixth lens on the optical axis in a reasonable range, the lens group can better balance the system chromatic aberration, meanwhile, the sixth lens does not cause difficulty in a processing technology due to too thin. More specifically, $2.10 \leq T67/CT6 \leq 2.63$.

In an exemplary embodiment, a combined focal length f12 of the first lens and the second lens, a center thickness CT1 of the first lens on the optical axis and a center thickness CT2 of the second lens on the optical axis satisfy: $6.6<f12/(CT1+CT2)<8.6$. Reasonable control of the combined focal length of the first lens and the second lens and the center thickness of the first lens on the optical axis and the center thickness of the second lens on the optical axis are beneficial to achieve a miniaturization of the system, reduce a ghost image risk, reduce the chromatic aberration of the system effectively in the matching of the first two lenses, meanwhile, avoid the technological difficulties caused by the thinness of the first two lenses. More specifically, $6.74 \leq f12/(CT1+CT2) \leq 8.48$.

In an exemplary embodiment, SAG51 is an on-axis distance between an intersection point of the object-side surface of the fifth lens and the optical axis and an effective radius vertex of the object-side surface of the fifth lens, SAG52 is an on-axis distance between an intersection point of the image-side surface of the fifth lens and the optical axis and an effective radius vertex of the image-side surface of the fifth lens, SAG41 is an on-axis distance between an intersection point of an object-side surface of the fourth lens and the optical axis and an effective radius vertex of the object-side surface of the fourth lens, and SAG42 is an on-axis distance between an intersection point of an image-side surface of the fourth lens and the optical axis and an effective radius vertex of the image-side surface of the fourth lens, and SAG51, SAG52, SAG41 and SAG42 satisfy: $1.7<(SAG51+SAG52)/(SAG41+SAG42)<2.5$. Reasonable control of this conditional expression is firstly helpful to improve an effective focal length of the system while maintaining an imaging quality of the lens group; Secondly, it is helpful to improve a spherical aberration of the middle field of view and a coma of the edge field of view, and enabling the system to have better aberration correction ability; Thirdly, it is helpful to increase a relative illumination of the system and improve an imaging quality of the lens in a darker environment. More specifically, $1.82 \leq (SAG51+SAG52)/(SAG41+SAG42) \leq 2.34$.

In an exemplary embodiment, SAG71 is an on-axis distance between an intersection point of an object-side surface of the seventh lens and the optical axis and an effective radius vertex of the object-side surface of the seventh lens, SAG61 is an on-axis distance between an intersection point of the object-side surface of the sixth lens and the optical axis and an effective radius vertex of the object-side surface of the sixth lens, and SAG71 and SAG61 satisfy: $1.6<SAG71/SAG61<2.3$. Reasonable control of this conditional expression, firstly, makes the a ray has a certain convergence function when passing through the object-side surface of the seventh lens, and better improves an aberration correction ability of the system; Second, it is helpful for the system to obtain a smaller F-number; The third point is to avoid the process problems such as processing difficulties caused by the oversized SAG71. More specifically, $1.89 \leq SAG71/SAG61 \leq 2.15$.

In an exemplary embodiment, the above optical imaging lens assembly may further include a diaphragm. The diaphragm may be arranged at an appropriate position as required, for example, the diaphragm may be arranged between the object side and the first lens. In an embodiment, the above optical imaging lens assembly may further include an optical filter for correcting color deviation and/or a protective glass for protecting photosensitive elements located on the imaging surface.

The optical imaging lens assembly according to the above embodiment of the disclosure may adopt multiple lenses, such as the above-mentioned seven lenses. By reasonably distributing the refractive power, surface type, center thickness of each lens and on-axis spacing distance between each lens, the optical imaging lens assembly has a larger imaging image surface, has the characteristics of wide imaging range and high imaging quality, and ensures the ultra-thinness of the mobile phone.

In an exemplary embodiment, at least one mirror surface of each lens is an aspheric mirror surface, that is, at least one mirror surface from the object-side surface of the first lens to the image-side surface of the seventh lens is an aspheric mirror surface. The characteristic of aspheric lens is that: the curvature changes continuously from the center of lens to the periphery of lens, and different from the spherical lens with constant curvature from the center of the lens to the periphery of the lens, the aspheric lens has better curvature radius characteristics and has the advantages of improving distortion aberration and astigmatism aberration. After adopting aspheric lens, the aberration during imaging can be eliminated as much as possible, thus improving the imaging quality. In an embodiment, at least one of the object-side surface and the image-side surface of each lens of the first lens, the second lens, the third lens, the fourth lens, the fifth lens, the sixth lens and the seventh lens is an aspheric mirror surface. In another embodiment, the object-side surface and the image-side surface of each lens of the first lens, the second lens, the third lens, the fourth lens, the fifth lens, the sixth lens and the seventh lens are all aspheric mirror surfaces.

However, those skilled in the art should understand that the number of lens constituting the optical imaging lens assembly can be changed to obtain the results and advantages described in this description without departing from the technical solution claimed in this application. For example, although the embodiment has been described with seven lenses as an example, the optical imaging lens assembly is not limited to seven lenses, but may further include other numbers of lens if necessary.

Specific embodiments of the optical imaging lens assembly suitable for the above embodiments will be further described below with reference to the accompanying drawings.

Embodiment 1

FIG. 1 shows a structural schematic diagram of the lens group of the optical imaging lens assembly according to Embodiment 1 of the disclosure, the optical imaging lens assembly sequentially includes from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from an object passes through each of the surfaces from S1 to S16 sequentially and is finally imaged on the imaging surface S17.

As shown in Table 1, it is a basic parameter table of the optical imaging lens assembly of Embodiment 1, wherein the units of curvature radius, thickness and focal length are all millimeters (mm).

The optical imaging lens assembly in Embodiment 1 satisfies the following requirements:
TTL/ImgH=1.15, wherein TTL is the on-axis distance from an object-side surface of the first lens to an imaging surface, and ImgH is the half of the diagonal length of the effective pixel region on the imaging surface;
f×tan(½FOV)=5.23 mm, wherein f is the effective focal length of the optical imaging lens assembly, and FOV is a maximum field of view of the optical imaging lens assembly;
f/EPD=1.74, wherein f is the effective focal length of the optical imaging lens assembly and EPD is an entrance pupil diameter of the optical imaging lens assembly;
f6/(R11+R12)=1.37, wherein f6 is an effective focal length of the sixth lens, R12 is a curvature radius of the image-side surface of the sixth lens, and R11 is a curvature radius of the object-side surface of the sixth lens;
f4/f1=2.55, wherein f4 is an effective focal length of the fourth lens, and f1 is an effective focal length of the first lens;
(f3+f7)/(f3−f7)=1.28, wherein f3 is an effective focal length of the third lens, and f7 is an effective focal length of the seventh lens;

TABLE 1

| Surface number | Surface type | Curvature radius | Thickness/ distance | Focal length | Refractive index | Abbe number | Conic coefficient |
|---|---|---|---|---|---|---|---|
| OBJ | Spherical | Infinity | Infinity | | | | |
| STO | Spherical | Infinity | −0.5435 | | | | |
| S1 | Aspheric | 2.1164 | 0.7019 | 5.84 | 1.54 | 56.1 | −0.0688 |
| S2 | Aspheric | 5.5561 | 0.1096 | | | | −12.1597 |
| S3 | Aspheric | 9.1386 | 0.2650 | −25.85 | 1.67 | 19.2 | −21.9509 |
| S4 | Aspheric | 5.9352 | 0.4395 | | | | 1.8599 |
| S5 | Aspheric | 23.0105 | 0.2700 | −30.47 | 1.67 | 19.2 | −59.1248 |
| S6 | Aspheric | 10.8308 | 0.1019 | | | | 0.0000 |
| S7 | Aspheric | 16.6519 | 0.5716 | 14.88 | 1.54 | 56.1 | 0.0000 |
| S8 | Aspheric | −15.6785 | 0.5397 | | | | 4.5610 |
| S9 | Aspheric | 5.3439 | 0.3500 | −167.89 | 1.57 | 37.3 | −8.7733 |
| S10 | Aspheric | 4.9411 | 0.3748 | | | | −1.0000 |
| S11 | Aspheric | 1.8893 | 0.4210 | 7.19 | 1.54 | 56.1 | −1.0000 |
| S12 | Aspheric | 3.3538 | 0.9372 | | | | −1.0000 |
| S13 | Aspheric | −3.7109 | 0.4325 | −3.77 | 1.54 | 55.7 | −1.0000 |
| S14 | Aspheric | 4.6346 | 0.1875 | | | | 0.0475 |
| S15 | Spherical | Infinity | 0.2100 | | 1.52 | 64.2 | |
| S16 | Spherical | Infinity | 0.2278 | | | | |
| S17 | Spherical | Infinity | | | | | |

As shown in Table 2, in Embodiment 1, f is a total effective focal length of the optical imaging lens assembly, and f=4.96 mm, TTL is a distance from the object-side surface S1 of the first lens E1 to the imaging surface S17 on the optical axis, and TTL=6.14 mm, ImgH is a half of a diagonal length of an effective pixel region on the imaging surface S17, and ImgH=5.35 mm.

TABLE 2

| Embodiment 1 | | | |
|---|---|---|---|
| f(mm) | 4.96 | TTL(mm) | 6.14 |
| ImgH(mm) | 5.35 | TTL/ImgH | 1.15 |
| F * tan(½FOV)(mm) | 5.23 | f/EPD | 1.74 |
| f6/(R11 + R12) | 1.37 | f4/f1 | 2.55 |
| (f3 + f7)/(f3 − f7) | 1.28 | (R3 + R4)/(R1 + R2) | 1.96 |
| R9/R10 | 1.08 | (R13 + R14)/CT7 | 2.14 |
| T67/CT6 | 2.23 | F12/(CT1 + CT2) | 7.34 |
| (SAG51 + SAG52)/(SAG41 + SAG42) | 1.82 | SAG71/SAG61 | 1.89 |

(R3+R4)/(R1+R2)=1.96, wherein R4 is a curvature radius of the image-side surface of the second lens, R3 is a curvature radius of the object-side surface of the second lens, R2 is a curvature radius of the image-side surface of the first lens, and R1 is a curvature radius of the object-side surface of the first lens;
R9/R10=1.08, wherein R10 is a curvature radius of the image-side surface of the fifth lens, and R9 is a curvature radius of the object-side surface of the fifth lens;
(R13+R14)/CT7=2.14, wherein R14 is a curvature radius of the image-side surface of the seventh lens, R13 is a curvature radius of the object-side surface of the seventh lens, and CT7 is a center thickness of the seventh lens on the optical axis;
T67/CT6=2.23, wherein T67 is the air space between the sixth lens and the seventh lens on the optical axis, and CT6 is a center thickness of the sixth lens on the optical axis;
f12/(CT1+CT2)=7.34, wherein f12 is a combined focal length of the first and second lenses, CT1 is a center thickness of the first lens on the optical axis, and CT2 is a center thickness of the second lens on the optical axis;

(SAG51+SAG52)/(SAG41+SAG42)=1.82, wherein SAG51 is an on-axis distance between an intersection point of the object-side surface of the fifth lens and the optical axis and an effective radius vertex of the object-side surface of the fifth lens, SAG52 is an on-axis distance between an intersection point of the image-side surface of the fifth lens and the optical axis and an effective radius vertex of the image-side surface of the fifth lens, SAG41 is an on-axis distance between an intersection point of the object-side surface of the fourth lens and the optical axis and an effective radius vertex of the object-side surface of the fourth lens, and SAG42 is an on-axis distance between an intersection point of the image-side surface of the fourth lens and the optical axis and an effective radius vertex of the image-side surface of the fourth lens;

SAG71/SAG61=1.89, wherein SAG71 is an on-axis distance between an intersection point of the object-side surface of the seventh lens and the optical axis and an effective radius vertex of the object-side surface of the seventh lens, and SAG61 is an on-axis distance between an intersection point of the object-side surface of the sixth lens and the optical axis and an effective radius vertex of the object-side surface of the sixth lens.

In Embodiment 1, both of the object-side surface and the image-side surface of any one of the first lens E1 to the seventh lens E7 are aspheric surfaces, and the surface type x of each aspheric lens can be defined by the following aspheric formula, but not limited to:

$$x = \frac{ch_i^2}{1+\sqrt{1-(k+1)c^2h^2}} + \sum A_i h^i \qquad (1)$$

wherein x is a vector height of a distance between the aspheric surface and a vertex of the aspheric surface when the aspheric surface is located at a position with the height h in the optical axis direction; c is a paraxial curvature of the aspheric surface, c=1/R (that is, the paraxial curvature c is an inverse of radius of curvature R in Table 1 above); k is a conic coefficient; Ai is a correction coefficient of the i-th order of aspheric surface.

In Embodiment 1, both of the object-side surface and the image-side surface of any one of the first lens E1 to the seventh lens E7 are aspheric surfaces, and Table 3 shows high-order coefficients A4, A6, A8, A10, A12, A14, A16, A18, A20, A22, A24, A26, A28 and A30 that may be used for each aspheric mirror surface S1-S14 in Embodiment 1.

TABLE 3

| Surface number | A4 | A6 | A8 | A10 | A12 | A14 | A16 |
|---|---|---|---|---|---|---|---|
| S1 | −2.0220E−03 | 2.5242E−02 | −6.8368E−02 | 1.1823E−01 | −1.2796E−01 | 8.7411E−02 | −3.6605E−02 |
| S2 | −1.3708E−02 | −3.9008E−03 | 2.2421E−02 | −3.7655E−02 | 4.0048E−02 | −2.6303E−02 | 9.5737E−03 |
| S3 | −2.6037E−02 | 1.8193E−02 | 2.0549E−03 | −2.5426E−03 | −1.5819E−03 | 3.3793E−03 | −3.0222E−03 |
| S4 | −3.6926E−03 | 1.0246E−02 | 3.8236E−02 | −8.4254E−02 | 1.1325E−01 | −9.8159E−02 | 5.2360E−02 |
| S5 | −5.2434E−02 | 5.8028E−02 | −1.8374E−01 | 3.8089E−01 | −5.1865E−01 | 4.4797E−01 | −2.3602E−01 |
| S6 | −6.1083E−02 | 2.7840E−02 | −2.2673E−02 | −2.4803E−03 | 2.6309E−02 | −2.8525E−02 | 1.5503E−02 |
| S7 | −4.6187E−02 | 2.3335E−02 | −3.2818E−02 | 3.3371E−02 | −2.2746E−02 | 9.5428E−03 | −1.8264E−03 |
| S8 | −3.7444E−02 | 2.2937E−02 | −4.1516E−02 | 4.5463E−02 | −3.3008E−02 | 1.5751E−02 | −4.7099E−03 |
| S9 | −6.3383E−02 | 7.7447E−02 | −7.4394E−02 | 4.9135E−02 | −2.2671E−02 | 6.7968E−03 | −1.2410E−03 |
| S10 | −1.4784E−01 | 1.4721E−01 | −1.1966E−01 | 7.2993E−02 | −3.2173E−02 | 9.7821E−03 | −2.0012E−03 |
| S11 | −1.0499E−01 | 6.6667E−02 | −4.8434E−02 | 2.2535E−02 | −7.5871E−03 | 1.8782E−03 | −3.2998E−04 |
| S12 | −1.8248E−02 | 1.1190E−02 | −1.1902E−02 | 4.3585E−03 | −8.1335E−04 | 8.5440E−05 | −4.7835E−06 |
| S13 | −1.0010E−01 | 7.4049E−02 | −3.0671E−02 | 8.6951E−03 | −1.7075E−03 | 2.3314E−04 | −2.2218E−05 |
| S14 | −1.0593E−01 | 5.6884E−02 | −1.9954E−02 | 4.4740E−03 | −6.4418E−04 | 5.7435E−05 | −2.7237E−06 |

| Surface number | A18 | A20 | A22 | A24 | A26 | A28 | A30 |
|---|---|---|---|---|---|---|---|
| S1 | 8.5797E−03 | −8.6740E−04 | 0.0000E+00 | 0.0000E+00 | 0.0000E+00 | 0.0000E+00 | 0.0000E+00 |
| S2 | −1.5676E−03 | 4.5470E−05 | 0.0000E+00 | 0.0000E+00 | 0.0000E+00 | 0.0000E+00 | 0.0000E+00 |
| S3 | 1.5472E−03 | −3.1052E−04 | 0.0000E+00 | 0.0000E+00 | 0.0000E+00 | 0.0000E+00 | 0.0000E+00 |
| S4 | −1.5214E−02 | 1.8637E−03 | 0.0000E+00 | 0.0000E+00 | 0.0000E+00 | 0.0000E+00 | 0.0000E+00 |
| S5 | 6.9119E−02 | −8.5643E−03 | 0.0000E+00 | 0.0000E+00 | 0.0000E+00 | 0.0000E+00 | 0.0000E+00 |
| S6 | −4.2177E−03 | 4.5685E−04 | 0.0000E+00 | 0.0000E+00 | 0.0000E+00 | 0.0000E+00 | 0.0000E+00 |
| S7 | 2.1208E−05 | 2.4759E−05 | 0.0000E+00 | 0.0000E+00 | 0.0000E+00 | 0.0000E+00 | 0.0000E+00 |
| S8 | 7.9847E−04 | −5.8035E−05 | 0.0000E+00 | 0.0000E+00 | 0.0000E+00 | 0.0000E+00 | 0.0000E+00 |
| S9 | 1.2272E−04 | −4.5633E−06 | −6.2761E−08 | 0.0000E+00 | 0.0000E+00 | 0.0000E+00 | 0.0000E+00 |
| S10 | 2.6974E−04 | −2.2989E−05 | 1.1272E−06 | −2.4996E−08 | 1.0224E−10 | −4.0113E−12 | 0.0000E+00 |
| S11 | 3.9913E−05 | −3.2223E−06 | 1.6444E−07 | −4.6896E−09 | 4.9944E−11 | 3.0952E−13 | 0.0000E+00 |
| S12 | 7.2255E−08 | 8.1741E−09 | −6.4015E−10 | 2.5747E−11 | −8.2938E−13 | 2.1541E−14 | −2.9136E−16 |
| S13 | 1.4725E−06 | −6.6636E−08 | 1.9780E−09 | −3.5921E−11 | 3.7516E−13 | −3.2170E−15 | 3.6712E−17 |
| S14 | 8.2944E−09 | 6.9462E−09 | −4.0505E−10 | 1.0187E−11 | −1.0074E−13 | 0.0000E+00 | 0.0000E+00 |

Figure 2A:
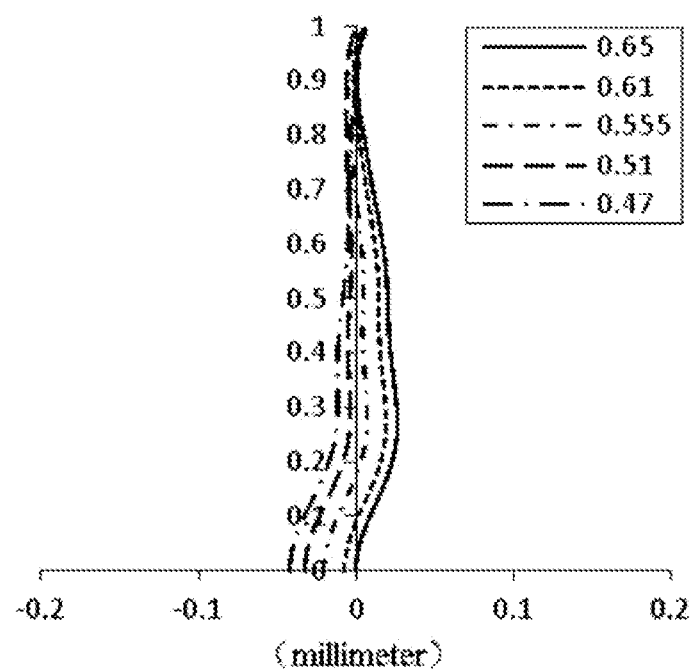
FIGS. 2a-2d show a longitudinal aberration curve, an astigmatism curve, a distortion curve and a lateral color curve of an optical imaging lens assembly according to Embodiment 1 of the disclosure respectively.
Figure 2B:
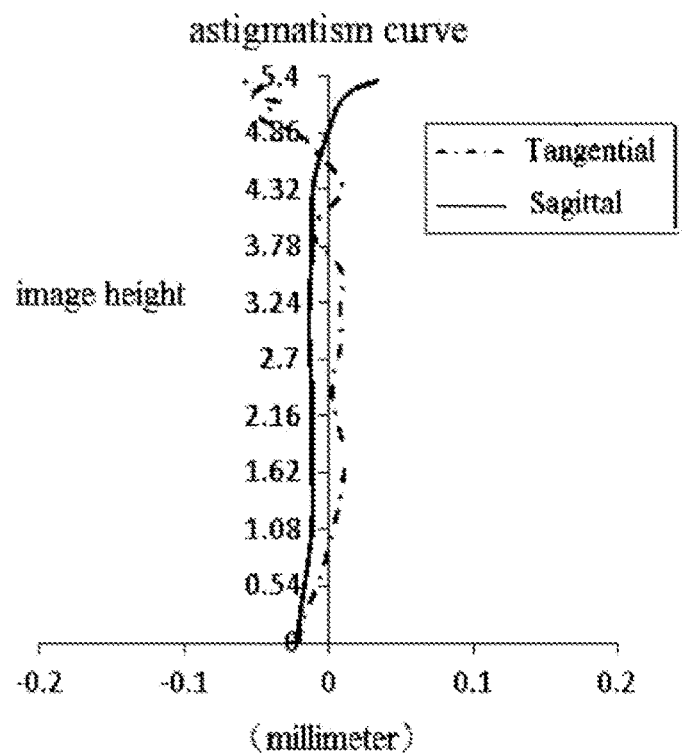
Figure 2C:
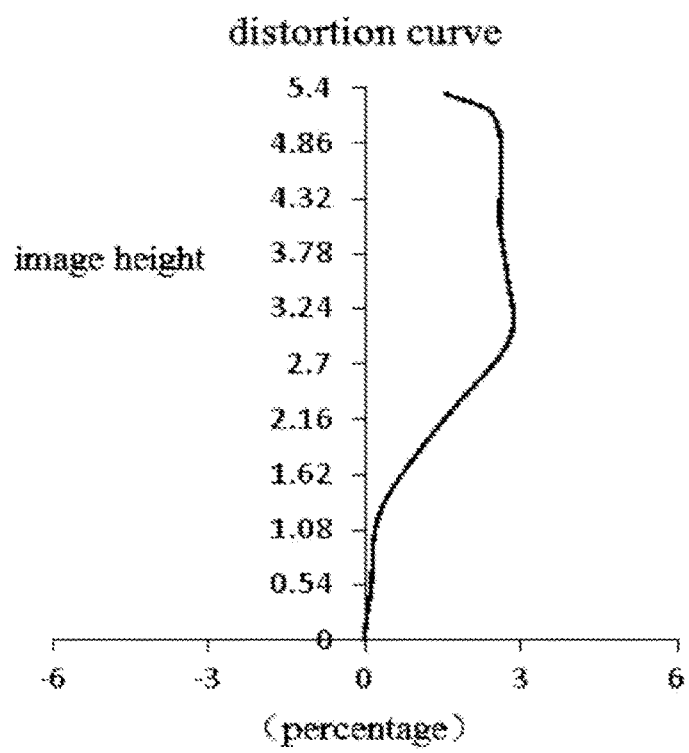
Figure 2D:
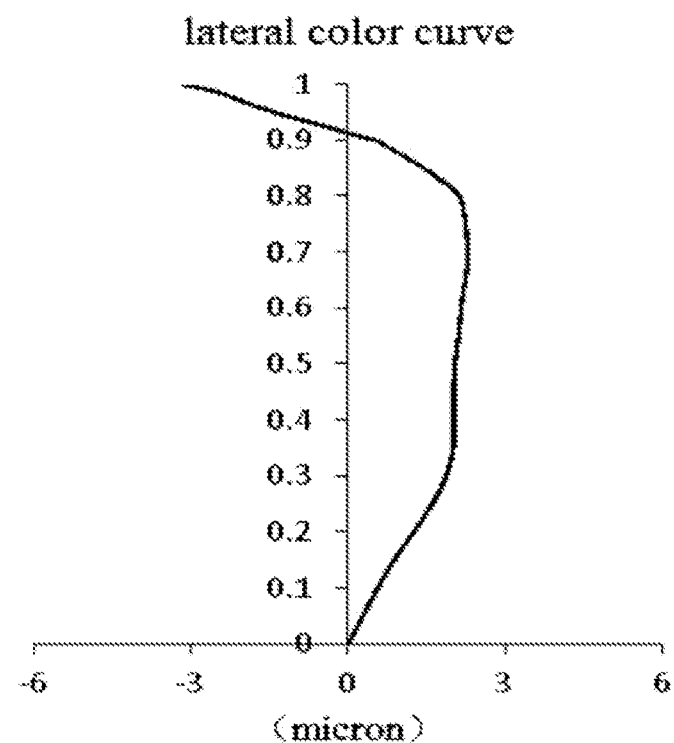

FIG. 2a shows a longitudinal aberration curve of the optical imaging lens assembly according to Embodiment 1 to represent deviations of a convergence focal point after light with different wavelengths passes through the lens. FIG. 2b shows an astigmatism curve of the optical imaging lens assembly according to Embodiment 1 to represent a tangential image surface curvature and a sagittal image surface curvature. FIG. 2c shows a distortion curve of the optical imaging lens assembly according to Embodiment 1 to represent distortion values corresponding to different image heights. FIG. 2d shows a lateral color curve of the optical imaging lens assembly according to Embodiment 1 to represent deviations of different image heights on the imaging surface after the light passes through the lens. According to FIGS. 2a 2d, it can be seen that the optical imaging lens assembly given in Embodiment 1 may achieve good imaging quality.

each of the surfaces S1 to S16 sequentially and is finally imaged on the imaging surface S17.

As shown in Table 4, it is a basic parameter table of the optical imaging lens assembly of Embodiment 2, wherein the units of curvature radius, thickness and focal length are all millimeters (mm).

TABLE 4

| Surface number | Surface type | Curvature radius | Thickness/ distance | Focal length | Refractive index | Abbe number | Conic coefficient |
|---|---|---|---|---|---|---|---|
| OBJ | Spherical | Infinity | Infinity | | | | |
| STO | Spherical | Infinity | −0.5404 | | | | |
| S1 | Aspheric | 2.2752 | 0.6975 | 6.40 | 1.54 | 56.1 | −0.0773 |
| S2 | Aspheric | 5.8245 | 0.1147 | | | | −14.9432 |
| S3 | Aspheric | 9.1207 | 0.3000 | −27.11 | 1.67 | 19.2 | −21.3452 |
| S4 | Aspheric | 6.0133 | 0.4555 | | | | 2.1390 |
| S5 | Aspheric | 26.4220 | 0.3100 | −28.95 | 1.67 | 19.2 | −55.2241 |
| S6 | Aspheric | 11.2050 | 0.1061 | | | | 0.0000 |
| S7 | Aspheric | 13.5864 | 0.5997 | 15.08 | 1.54 | 56.1 | 0.0000 |
| S8 | Aspheric | −20.5517 | 0.6239 | | | | 4.8977 |
| S9 | Aspheric | 5.0534 | 0.4000 | −52.52 | 1.57 | 37.3 | −5.1044 |
| S10 | Aspheric | 4.1996 | 0.3636 | | | | −1.0000 |
| S11 | Aspheric | 2.1358 | 0.4001 | 5.96 | 1.54 | 56.1 | −1.0000 |
| S12 | Aspheric | 5.8100 | 1.0023 | | | | −1.0000 |
| S13 | Aspheric | −3.6196 | 0.4389 | −3.85 | 1.54 | 55.7 | 1.0000 |
| S14 | Aspheric | 5.0302 | 0.2519 | | | | 0.0401 |
| S15 | Spherical | Infinity | 0.2310 | | 1.52 | 64.2 | |
| S16 | Spherical | Infinity | 0.3051 | | | | |
| S17 | Spherical | Infinity | | | | | |

Embodiment 2

Figure 3:
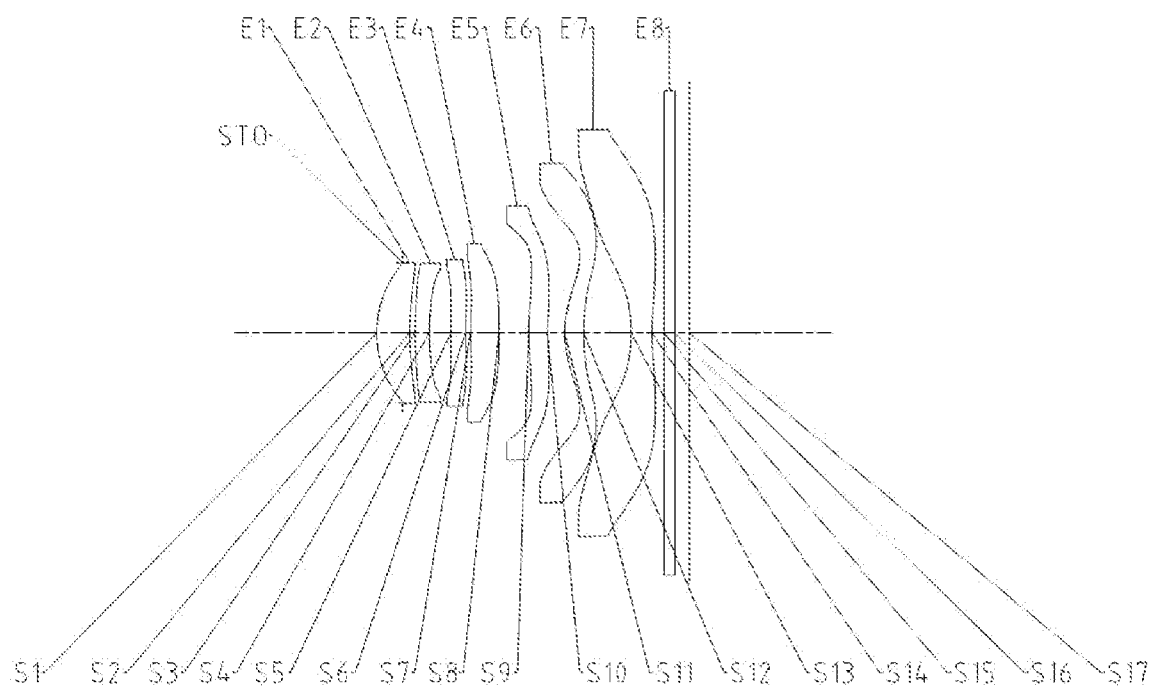
FIG. 3 shows a structural schematic diagram of the lens group of an optical imaging lens assembly according to Embodiment 2 of the disclosure.

FIG. 3 shows a structural schematic diagram of the lens group of the optical imaging lens assembly according to Embodiment 2 of the disclosure, the optical imaging lens assembly sequentially includes from an object side to an image-side surface along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from an object passes through As shown in Table 5, in Embodiment 2, f is a total effective focal length of the optical imaging lens assembly, and f=5.34 mm, TTL is a distance from the object-side surface S1 of the first lens E1 to the imaging surface S17 on the optical axis, and TTL=6.60 mm, ImgH is a half of a diagonal length of an effective pixel region on the imaging surface S17, and ImgH=5.90 mm. The parameters of each relational expression are as explained in Embodiment 1, and the numerical values of each relational expression are listed in the following table.

TABLE 5

| Embodiment 2 | | | |
|---|---|---|---|
| f(mm) | 5.34 | TTL(mm) | 6.60 |
| ImgH(mm) | 5.90 | TTL/ImgH | 1.12 |
| F × tan(½FOV)(mm) | 5.77 | f/EPD | 1.80 |
| f6/(R11 + R12) | 0.75 | f4/f1 | 2.36 |
| (f3 + f7)/(f3 − f7) | 1.31 | (R3 + R4)/(R1 + R2) | 1.87 |
| R9/R10 | 1.20 | (R13 + R14)/CT7 | 3.21 |
| T67/CT6 | 2.51 | f12/(CT1 + CT2) | 7.88 |
| (SAG51 + SAG52)/(SAG41 + SAG42) | 1.95 | SAG71/SAG61 | 2.15 |

In Embodiment 2, both of the object-side surface and the image-side surface of any one of the first lens E1 to the seventh lens E7 are aspheric surfaces, and Table 6 shows high-order coefficients A4, A6, A8, A10, A12, A14, A16, A18, A20, A22, A24, A26, A28 and A30 that can be used for each aspheric mirror surface S1-S14 in Embodiment 2.

TABLE 6

| | A4 | A6 | A8 | A10 | A12 | A14 | A16 |
|---|---|---|---|---|---|---|---|
| S1 | −2.4448E−04 | 1.2403E−02 | −2.9363E−02 | 4.5196E−02 | −4.3306E−02 | 2.6138E−02 | −9.6959E−03 |
| S2 | −1.2470E−02 | 4.0542E−03 | −8.3328E−03 | 2.0914E−02 | −2.7803E−02 | 2.2201E−02 | −1.0869E−02 |
| S3 | −2.1222E−02 | 4.2675E−03 | 2.8029E−02 | −4.8713E−02 | 5.1003E−02 | −3.3513E−02 | 1.2931E−02 |
| S4 | −4.7896E−03 | 1.4169E−02 | 1.6957E−03 | −8.0781E−02 | 1.7323E−02 | −2.1597E−02 | 1.4670E−02 |
| S5 | −4.1854E−02 | 5.2438E−02 | −1.4967E−01 | 2.7338E−01 | −3.2383E−01 | 2.4181E−01 | −1.0963E−01 |
| S6 | −5.8000E−02 | 5.2154E−02 | −7.4695E−02 | 7.3779E−02 | −4.8662E−02 | 1.9948E−02 | −4.4841E−03 |
| S7 | −5.1895E−02 | 4.8903E−02 | −6.9636E−02 | 7.0663E−02 | −4.8450E−02 | 2.1324E−02 | −5.5778E−03 |
| S8 | −3.6637E−02 | 2.1311E−02 | −2.4950E−02 | 1.8959E−02 | −1.0012E−02 | 3.6128E−03 | −8.5123E−04 |
| S9 | −7.6696E−02 | 7.1671E−02 | −5.8729E−02 | 3.4771E−02 | −1.4180E−02 | 3.7186E−03 | −5.9180E−04 |
| S10 | −1.5022E−01 | 1.1377E−01 | −7.8039E−02 | 4.2065E−02 | −1.6160E−02 | 4.2114E−03 | −7.3157E−04 |
| S11 | −6.0258E−02 | 3.3035E−02 | −2.4344E−02 | 1.0389E−02 | −3.0854E−03 | 6.5870E−04 | −9.8511E−05 |
| S12 | 2.8527E−02 | −8.2980E−03 | −4.3731E−03 | 2.5221E−03 | −6.0591E−04 | 8.9052E−05 | −8.7933E−06 |
| S13 | −5.9220E−02 | 2.9887E−02 | −6.7060E−03 | 9.4202E−04 | −8.7867E−05 | 5.0583E−06 | 1.1207E−07 |
| S14 | −5.9201E−02 | 1.7603E−02 | −2.5741E−03 | −7.7415E−05 | 1.0105E−04 | −1.9881E−05 | 2.1793E−06 |

| | A18 | A20 | A22 | A24 | A26 | A28 | A30 |
|---|---|---|---|---|---|---|---|
| S1 | 2.0239E−03 | 1.8479E−04 | 0.0000E+00 | 0.0000E+00 | 0.0000E+00 | 0.0000E+00 | 0.0000E+00 |
| S2 | 2.9779E−03 | −3.4834E−04 | 0.0000E+00 | 0.0000E+00 | 0.0000E+00 | 0.0000E+00 | 0.0000E+00 |
| S3 | −2.5602E−03 | 1.8826E−04 | 0.0000E+00 | 0.0000E+00 | 0.0000E+00 | 0.0000E+00 | 0.0000E+00 |
| S4 | −5.0316E−03 | 7.0566E−04 | 0.0000E+00 | 0.0000E+00 | 0.0000E+00 | 0.0000E+00 | 0.0000E+00 |
| S5 | 2.7443E−02 | −2.8817E−03 | 0.0000E+00 | 0.0000E+00 | 0.0000E+00 | 0.0000E+00 | 0.0000E+00 |
| S6 | 4.3110E−04 | 1.0912E−06 | 0.0000E+00 | 0.0000E+00 | 0.0000E+00 | 0.0000E+00 | 0.0000E+00 |
| S7 | 7.8182E−04 | −4.5141E−05 | 0.0000E+00 | 0.0000E+00 | 0.0000E+00 | 0.0000E+00 | 0.0000E+00 |
| S8 | 1.1970E−04 | −7.5510E−06 | 0.0000E+00 | 0.0000E+00 | 0.0000E+00 | 0.0000E+00 | 0.0000E+00 |
| S9 | 5.0694E−05 | −1.5662E−06 | −2.6641E−08 | 0.0000E+00 | 0.0000E+00 | 0.0000E+00 | 0.0000E+00 |
| S10 | 8.3307E−05 | −5.9767E−06 | 2.4612E−07 | −4.6064E−09 | 1.9401E−11 | −6.1983E−13 | 0.0000E+00 |
| S11 | 1.0070E−05 | −6.8432E−07 | 2.9323E−08 | −7.0170E−10 | 6.3120E−12 | 3.0909E−14 | 0.0000E+00 |
| S12 | 5.9315E−07 | −2.6554E−08 | 7.2716E−10 | −9.6990E−12 | −9.1159E−15 | 1.8285E−15 | −2.0081E−17 |
| S13 | −7.1411E−09 | 7.3699E−10 | −3.0835E−11 | 7.5574E−13 | −1.2802E−14 | 1.7819E−16 | −1.5695E−18 |
| S14 | −1.5167E−07 | 6.8409E−09 | "1.9397E−10 | 3.1445E−12 | −2.2239E−14 | 0.0000E+00 | 0.0000E+00 |

Figure 4A:
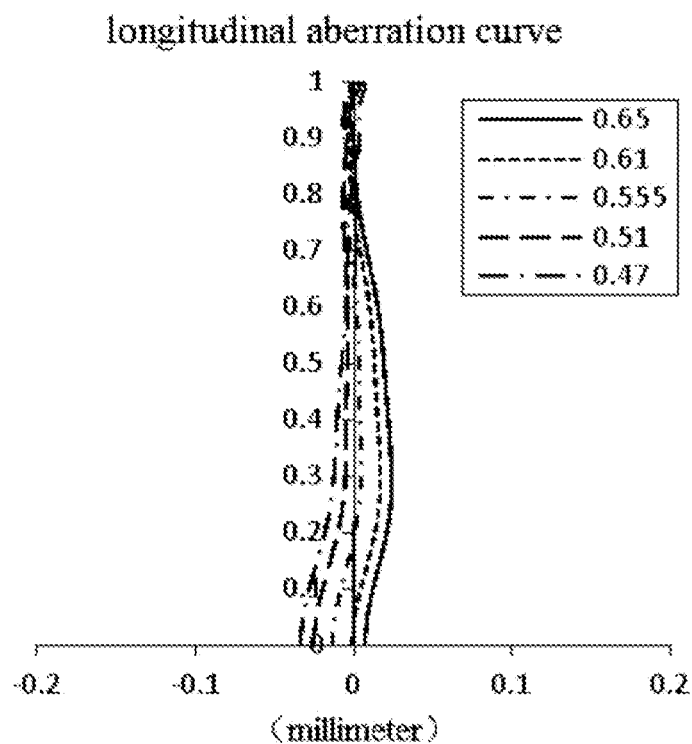
FIGS. 4a-4d show a longitudinal aberration curve, an astigmatism curve, a distortion curve and a lateral color curve of an optical imaging lens assembly according to Embodiment 2 of the disclosure respectively.
Figure 4B:
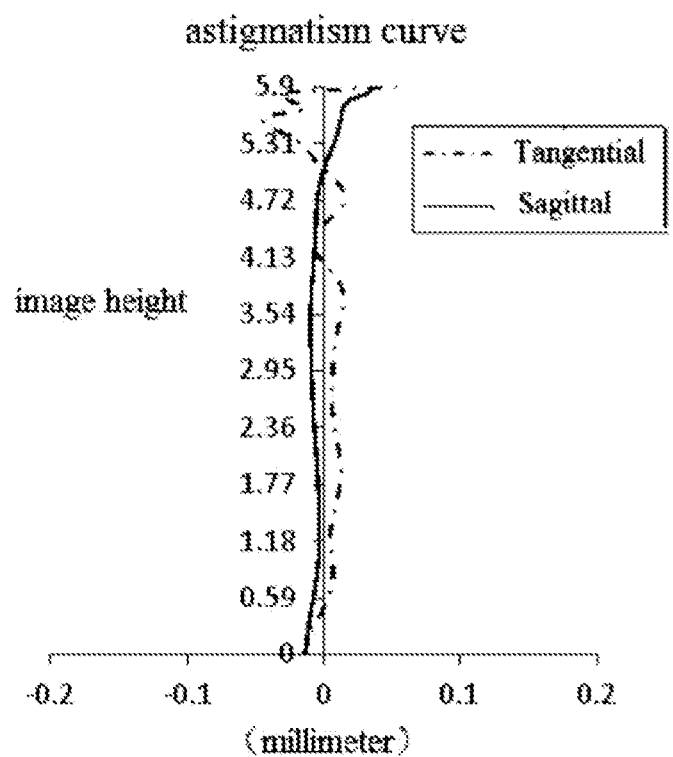
Figure 4C:
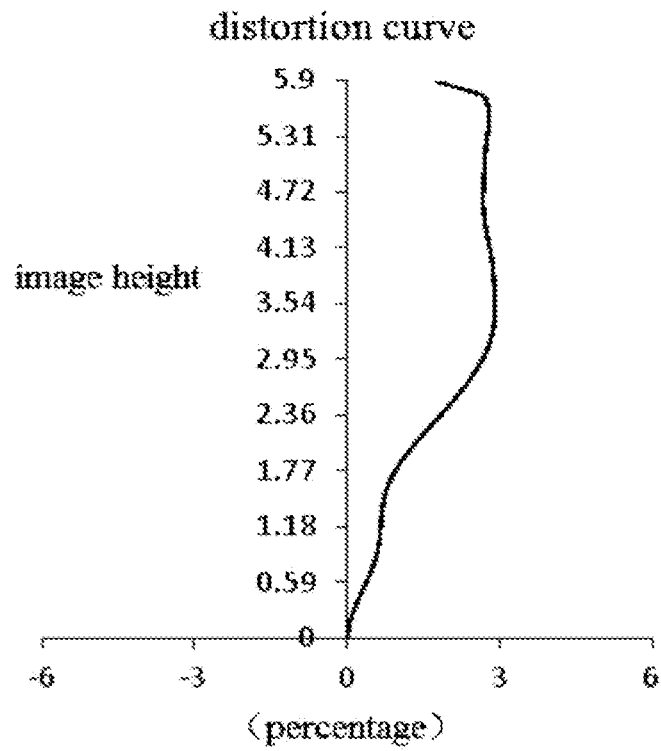
Figure 4D:
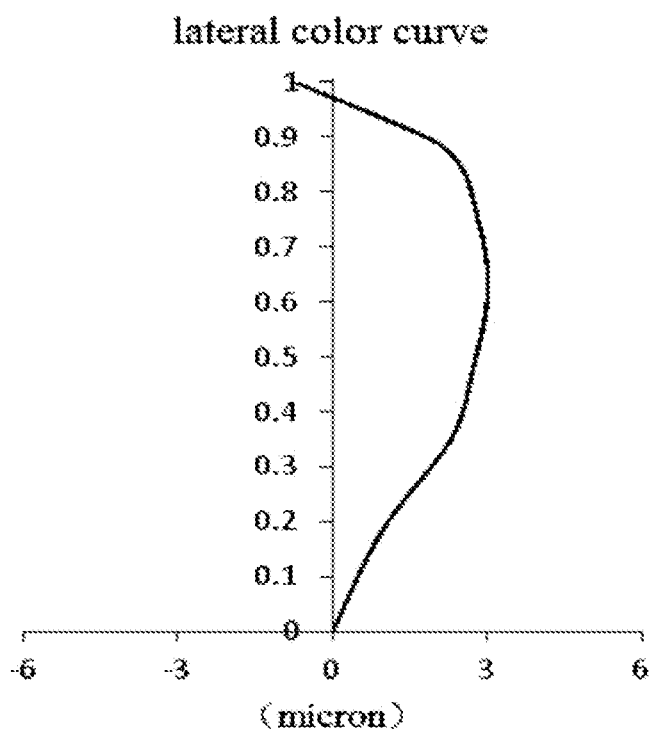

FIG. 4a shows a longitudinal aberration curve of the optical imaging lens assembly according to Embodiment 2, to represent deviations of a convergence focal point after light with different wavelengths passes through the lens. FIG. 4b shows an astigmatism curve of the optical imaging lens assembly according to Embodiment 2, to represent a tangential image surface curvature and a sagittal image surface curvature. FIG. 4c shows a distortion curve of the optical imaging lens assembly according to Embodiment 2, to represent distortion values corresponding to different image heights. FIG. 4d shows a lateral color curve of the optical imaging lens assembly according to Embodiment 2, to represent deviations of different image heights on the imaging surface after the light passes through the lens. According to FIGS. 4a-4d, it can be seen that the optical imaging lens assembly given in Embodiment 2 may achieve good imaging quality.

Embodiment 3

Figure 5:
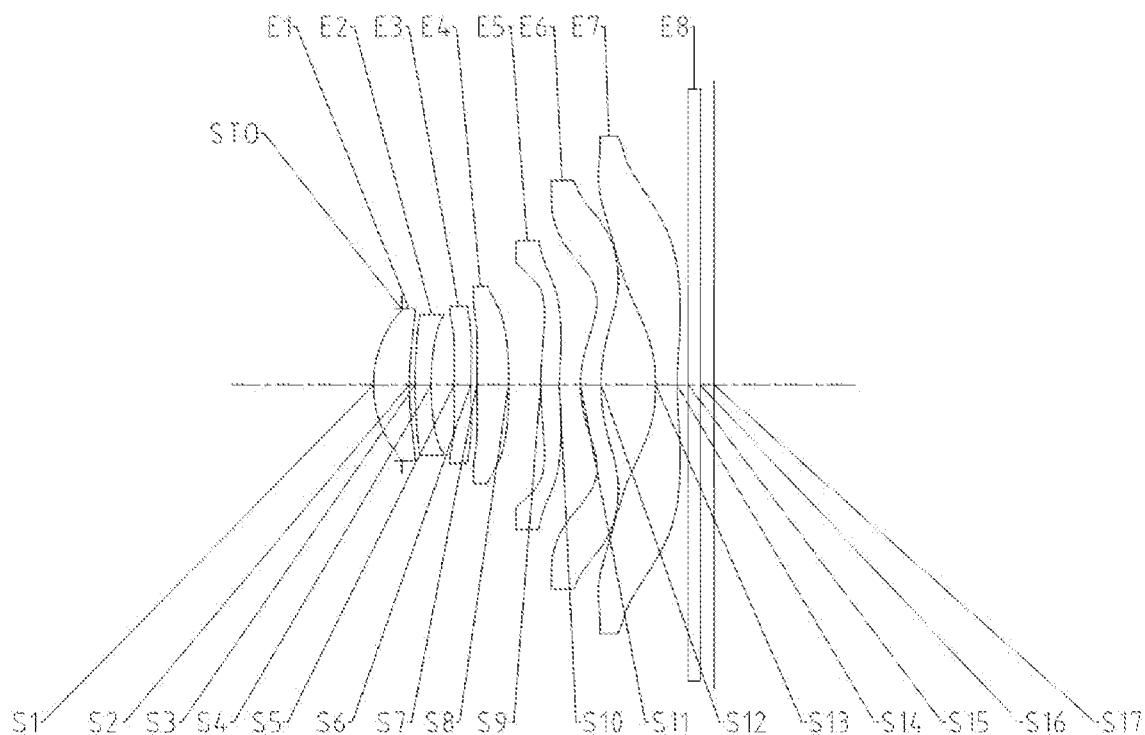
FIG. 5 shows a structural schematic diagram of the lens group of an optical imaging lens assembly according to Embodiment 3 of the disclosure.

FIG. 5 shows a structural schematic diagram of the lens group of the optical imaging lens assembly according to Embodiment 3 of the disclosure, the optical imaging lens assembly sequentially includes from an object side to an image-side surface along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a negative refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from an object passes through each of the surfaces S1 to S16 sequentially and is finally imaged on the imaging surface S17.

As shown in Table 7, it is a basic parameter table of the optical imaging lens assembly of Embodiment 3, wherein the units of curvature radius, thickness and focal length are all millimeters (mm).

TABLE 7

| Surface number | Surface type | Curvature radius | Thickness/distance | Focal length | Refractive index | Abbe number | Conic coefficient |
|---|---|---|---|---|---|---|---|
| OBJ | Spherical | Infinity | Infinity | | | | |
| STO | Spherical | Infinity | −0.5955 | | | | |
| S1 | Aspheric | 2.4692 | 0.7592 | 6.83 | 1.54 | 56.1 | −0.0700 |
| S2 | Aspheric | 6.5172 | 0.1237 | | | | −14.1320 |
| S3 | Aspheric | 10.3438 | 0.3400 | −25.85 | 1.67 | 19.2 | −17.9051 |
| S4 | Aspheric | 6.4169 | 0.4914 | | | | 2.2912 |
| S5 | Aspheric | 32.4123 | 0.3500 | −33.40 | 1.67 | 19.2 | −47.0352 |
| S6 | Aspheric | 13.2679 | 0.1260 | | | | 0.0000 |
| S7 | Aspheric | 16.1108 | 0.6720 | 16.64 | 1.54 | 56.1 | 0.0000 |
| S8 | Aspheric | −20.5316 | 0.6803 | | | | 5.0512 |
| S9 | Aspheric | 5.2778 | 0.4000 | −581.86 | 1.57 | 37.3 | −7.6471 |
| S10 | Aspheric | 5.0522 | 0.4424 | | | | −1.0000 |
| S11 | Aspheric | 2.3563 | 0.4398 | 8.14 | 1.54 | 56.1 | −1.0000 |
| S12 | Aspheric | 4.6842 | 1.1554 | | | | 0.0139 |
| S13 | Aspheric | −4.2111 | 0.4500 | −4.38 | 1.54 | 55.7 | −1.0000 |
| S14 | Aspheric | 5.5288 | 0.2387 | | | | 0.0413 |
| S15 | Spherical | Infinity | 0.2541 | | 1.52 | 64.2 | |
| S16 | Spherical | Infinity | 0.2972 | | | | |
| S17 | Spherical | Infinity | | | | | |

As shown in Table 8, in Embodiment 3, f is a total effective focal length of the optical imaging lens assembly, and f=5.89 mm, TTL is a distance from the object-side surface S1 of the first lens E1 to the imaging surface S17 on the optical axis, and TTL=7.22 mm, ImgH is a half of a diagonal length of an effective pixel region on the imaging surface S17, and ImgH=6.20 mm. The parameters of each relational expression are as explained in Embodiment 1, and the numerical values of each relational expression are listed in the following table.

TABLE 8

Embodiment 3

| f(mm) | 5.89 | TTL(mm) | 1.22 |
|---|---|---|---|
| ImgH(mm) | 6.20 | TTL/ImgH | 1.17 |

TABLE 8-continued

Embodiment 3

| F × tan(½FOV)(mm) | 6.01 | f/EPD | 1.82 |
|---|---|---|---|
| f6/(R11 + R12) | 1.16 | f4/f1 | 2.44 |
| (f3 + f7)/(f3 − f7) | 1.30 | (R3 + R4)/(R1 + R2) | 1.87 |
| R9/R10 | 1.04 | (R13 + R14)/CT7 | 2.93 |
| T67/CT6 | 2.63 | f12/(CT1 + CT2) | 7.86 |
| (SAG51 + SAG52)/(SAG41 + SAG42) | 1.88 | SAG71/SAG61 | 1.90 |

In Embodiment 3, both of the object-side surface and the image-side surface of any one of the first lens E1 to the seventh lens E7 are aspheric surfaces, and Table 9 shows high-order coefficients A4, A6, A8, A10, A12, A14, A16, A18, A20, A22, A24, A26, A28 and A30 that can be used for each aspheric mirror surface S1-S14 in Embodiment 3.

TABLE 9

| Surface number | | | | | | | |
|---|---|---|---|---|---|---|---|
| | A4 | A6 | A8 | A10 | A12 | A14 | A16 |
| S1 | 5.0680E−04 | 5.6104E−03 | −1.1349E−02 | 1.5225E−02 | −1.2612E−02 | 6.5571E−03 | −2.0915E−03 |
| S2 | −9.3313E−03 | 4.5583E−03 | −8.9048E−03 | 1.5594E−02 | −1.5919E−02 | 1.0020E−02 | −3.8919E−03 |
| S3 | −1.3112E−02 | 4.8934E−04 | 1.9413E−03 | −2.9028E−02 | 2.6187E−02 | −1.4778E−02 | 4.9579E−03 |
| S4 | −1.6577E−03 | 1.2685E−02 | −1.1683E−02 | 1.7286E−02 | −1.4677E−02 | 6.5487E−03 | −1.2048E−03 |
| S5 | −2.9745E−02 | 2.0346E−02 | −4.6871E−02 | 7.1127E−02 | −7.1539E−02 | 4.5335E−02 | −1.7346E−02 |
| S6 | −4.0865E−02 | 2.2888E−02 | −2.2652E−02 | 1.3518E−02 | −3.8117E−03 | −6.3734E−04 | 8.9679E−04 |
| S7 | −3.6211E−02 | 2.6427E−02 | −3.2214E−02 | 2.8088E−02 | −1.6804E−02 | 6.5036E−03 | −1.4944E−03 |
| S8 | −2.8047E−02 | 1.4394E−02 | −1.3975E−02 | 8.9363E−03 | −3.9464E−03 | 1.1737E−03 | −2.2405E−04 |
| S9 | −5.4255E−02 | 4.0223E−02 | −2.5689E−02 | 1.2208E−02 | −4.0866E−03 | 8.8622E−04 | −1.1710E−04 |
| S10 | −1.0123E−01 | 6.0881E−02 | −3.2519E−02 | 1.4040E−02 | −4.4181E−03 | 9.4705E−04 | −1.3491E−04 |
| S11 | −3.7900E−02 | 1.3658E−02 | −8.8335E−03 | 2.9394E−03 | −6.4871E−04 | 1.0248E−04 | −1.1391E−05 |
| S12 | 1.8404E−02 | −6.0711E−03 | −2.4107E−03 | 1.3391E−03 | −2.9976E−04 | 4.0608E−05 | −3.6335E−06 |
| S13 | −4.3580E−02 | 1.8679E−02 | −3.5766E−03 | 4.3135E−04 | −3.5251E−05 | 1.8991E−06 | −5.7369E−08 |
| S14 | −4.5685E−02 | 1.1341E−02 | −1.5248E−03 | 2.5897E−05 | 2.5598E−05 | −4.7115E−06 | 4.4670E−07 |

| Surface number | | | | | | | |
|---|---|---|---|---|---|---|---|
| | A18 | A20 | A22 | A24 | A26 | A28 | A30 |
| S1 | 3.7492E−04 | −2.9414E−05 | 0.0000E+00 | 0.0000E+00 | 0.0000E+00 | 0.0000E+00 | 0.0000E+00 |
| S2 | 8.5202E−04 | −8.0244E−05 | 0.0000E+00 | 0.0000E+00 | 0.0000E+00 | 0.0000E+00 | 0.0000E+00 |
| S3 | −8.8153E−04 | 6.2370E−05 | 0.0000E+00 | 0.0000E+00 | 0.0000E+00 | 0.0000E+00 | 0.0000E+00 |
| S4 | −4.7869E−05 | 3.6418E−05 | 0.0000E+00 | 0.0000E+00 | 0.0000E+00 | 0.0000E+00 | 0.0000E+00 |
| S5 | 3.6392E−03 | −3.1648E−04 | 0.0000E+00 | 0.0000E+00 | 0.0000E+00 | 0.0000E+00 | 0.0000E+00 |
| S6 | −2.6200E−04 | 2.6397E−05 | 0.0000E+00 | 0.0000E+00 | 0.0000E+00 | 0.0000E+00 | 0.0000E+00 |
| S7 | 1.8353E−04 | −9.2617E−06 | 0.0000E+00 | 0.0000E+00 | 0.0000E+00 | 0.0000E+00 | 0.0000E+00 |

TABLE 9-continued

| | | | | | | |
|---|---|---|---|---|---|---|
| S8 | 2.5171E−05 | −1.2635E−06 | 0.0000E+00 | 0.0000E+00 | 0.0000E+00 | 0.0000E+00 | 0.0000E+00 |
| S9 | 8.3961E−06 | −2.2526E−07 | −2.4607E−09 | 0.0000E+00 | 0.0000E+00 | 0.0000E+00 | 0.0000E+00 |
| S10 | 1.2541E−05 | −7.2984E−07 | 2.3981E−08 | −3.2561E−10 | −6.7221E−13 | −4.3347E−15 | 0.0000E+00 |
| S11 | 8.6401E−07 | −4.3210E−08 | 1.3491E−09 | −2.3655E−11 | 1.8333E−13 | −2.9714E−16 | 0.0000E+00 |
| S12 | 2.1693E−07 | −8.3031E−09 | 1.7786E−10 | −8.7643E−13 | −5.1604E−14 | 1.2402E−15 | −9.7939E−18 |
| S13 | 1.3344E−10 | 6.5491E−11 | −2.8395E−12 | 6.3467E−14 | −9.5911E−16 | 1.1545E−17 | −8.3606E−20 |
| S14 | −2.6337E−08 | 9.9721E−10 | −2.3616E−11 | 3.1879E−13 | −1.8736E−15 | 0.0000E+00 | 0.0000E+00 |

Figure 6A:
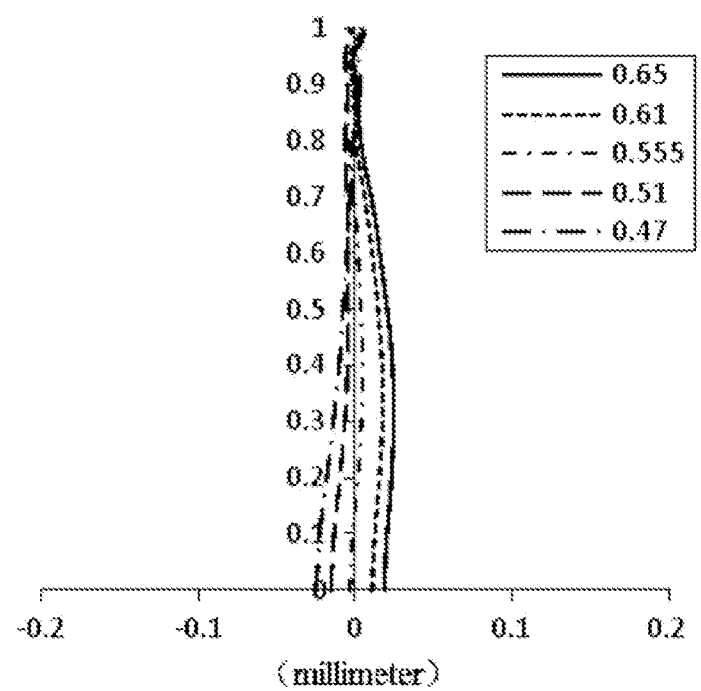
FIGS. 6a-6d show a longitudinal aberration curve, an astigmatism curve, a distortion curve and a lateral color curve of an optical imaging lens assembly according to Embodiment 3 of the disclosure respectively.
Figure 6B:
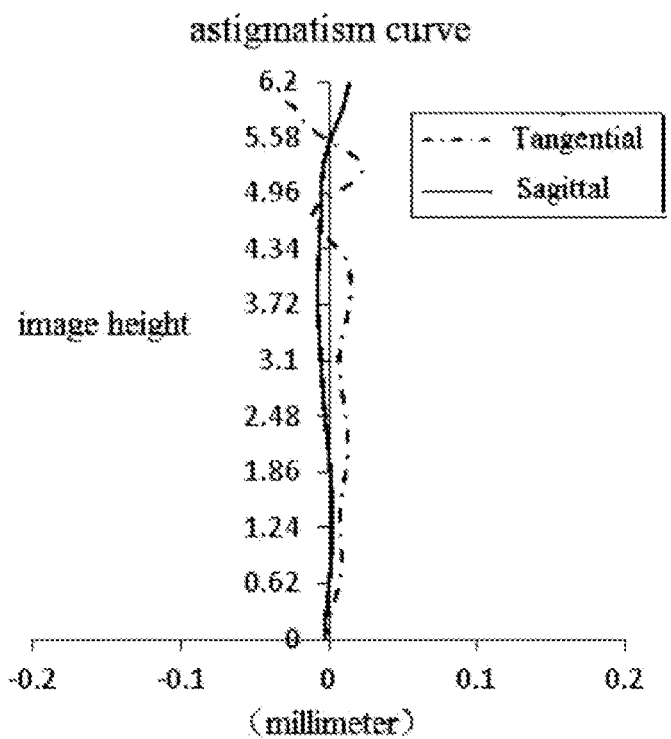
Figure 6C:
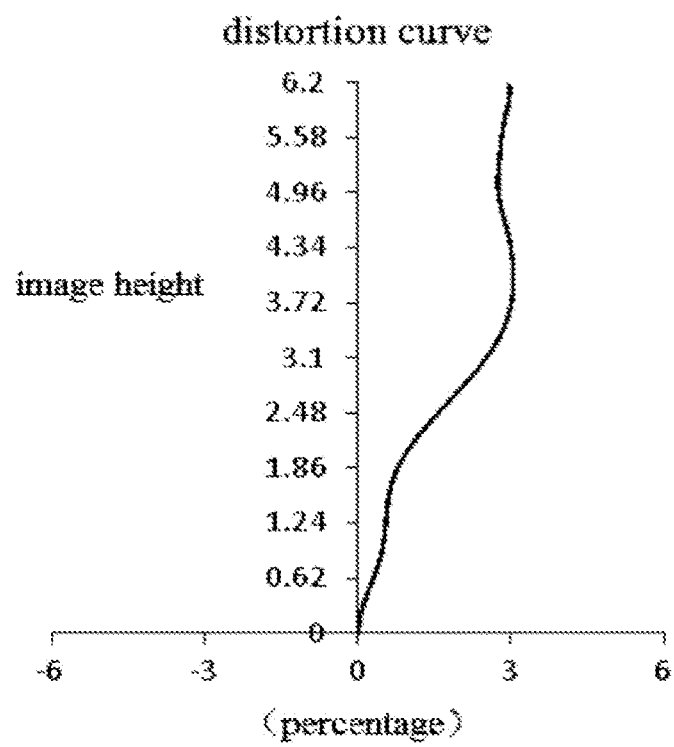
Figure 6D:
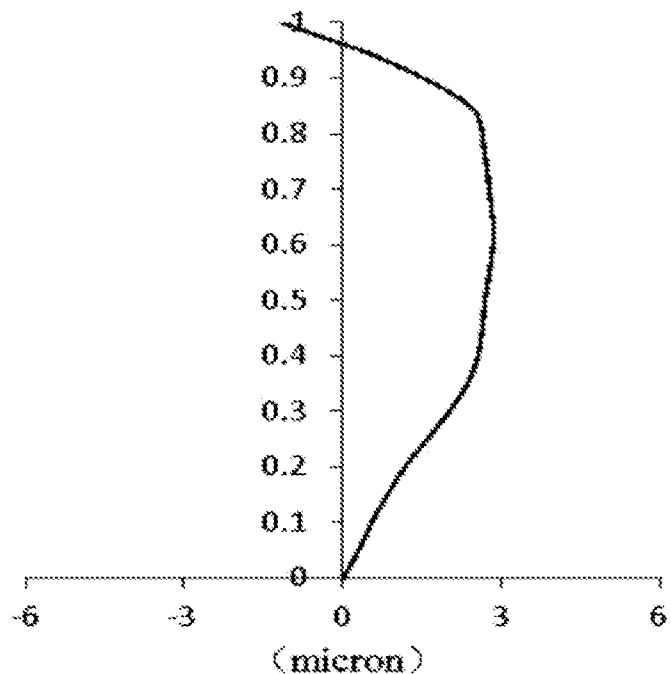

FIG. 6a shows a longitudinal aberration curve of the optical imaging lens assembly according to Embodiment 3, to represent deviations of a convergence focal point after light with different wavelengths passes through the lens. FIG. 6b shows an astigmatism curve of the optical imaging lens assembly according to Embodiment 3, to represent a tangential image surface curvature and a sagittal image surface curvature. FIG. 6c shows a distortion curve of the optical imaging lens assembly according to f Embodiment 3, to represent distortion values corresponding to different image heights. FIG. 6d shows a lateral color curve of the optical imaging lens assembly according to Embodiment 3, to represent deviations of different image heights on the imaging surface after the light passes through the lens. According to FIGS. 6a-6d, it can be seen that the optical imaging lens assembly given in Embodiment 3 may achieve good imaging quality.

Embodiment 4

Figure 7:
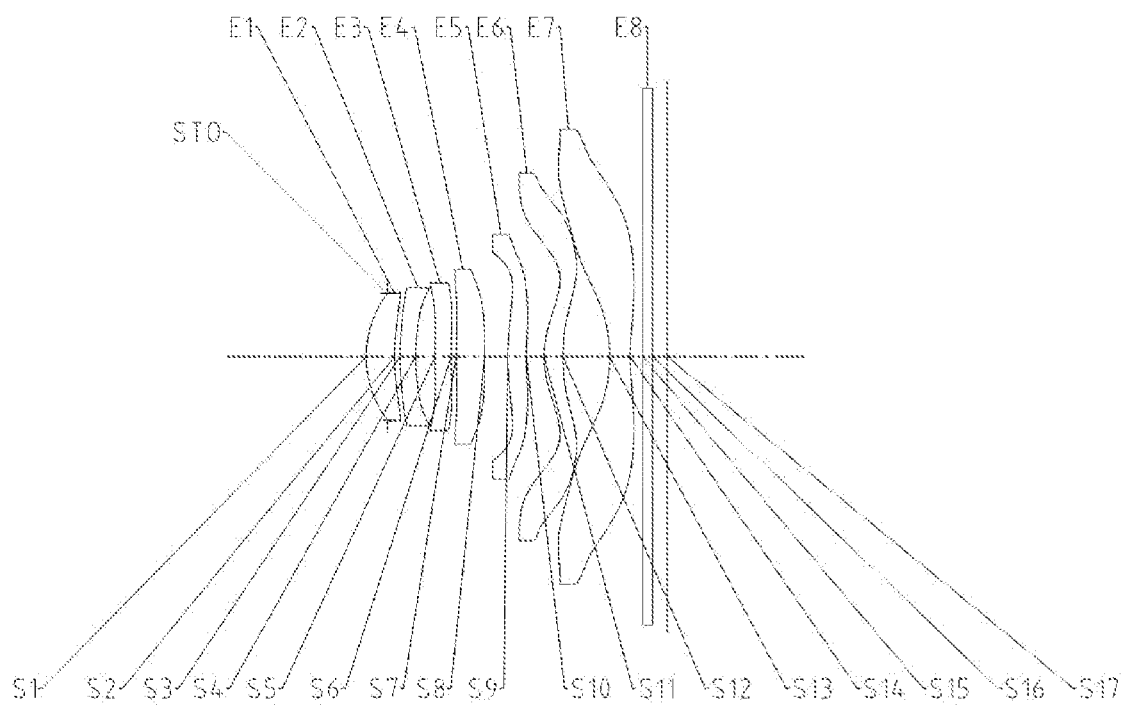
FIG. 7 shows a structural schematic diagram of the lens group of an optical imaging lens assembly according to Embodiment 4 of the disclosure.

FIG. 7 shows a structural schematic diagram of the lens group of the optical imaging lens assembly according to Embodiment 4 of the disclosure, the optical imaging lens assembly sequentially includes from an object side to an image-side surface along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a positive refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from an object passes through each of the surfaces S1 to S16 sequentially and is finally imaged on the imaging surface S17.

As shown in Table 10, it is a basic parameter table of the optical imaging lens assembly of Embodiment 4, wherein the units of curvature radius, thickness and focal length are all millimeters (mm).

TABLE 10

| Surface number | Surface type | Curvature radius | Thickness/ distance | Focal length | Refractive index | Abbe number | Conic coefficient |
|---|---|---|---|---|---|---|---|
| OBJ | Spherical | Infinity | Infinity | | | | |
| STO | Spherical | Infinity | −0.4524 | | | | |
| S1 | Aspheric | 2.3157 | 0.6131 | 7.59 | 1.54 | 56.1 | −0.0421 |
| S2 | Aspheric | 4.7569 | 0.1164 | | | | −18.2187 |
| S3 | Aspheric | 5.7558 | 0.3400 | −77.22 | 1.67 | 19.2 | −23.5638 |
| S4 | Aspheric | 5.0617 | 0.4148 | | | | 0.6277 |
| S5 | Aspheric | 22.6746 | 0.3500 | −36.47 | 1.67 | 19.2 | −121.1523 |
| S6 | Aspheric | 11.7515 | 0.1104 | | | | 0.0000 |
| S7 | Aspheric | 12.5515 | 0.6164 | 22.79 | 1.54 | 56.1 | 0.0000 |
| S8 | Aspheric | −1399.9501 | 0.5000 | | | | 4.1019 |
| S9 | Aspheric | 4.4322 | 0.4000 | 100.01 | 1.57 | 37.3 | −9.2145 |
| S10 | Aspheric | 4.6480 | 0.3844 | | | | −1.0000 |
| S11 | Aspheric | 2.0109 | 0.4099 | 6.13 | 1.54 | 56.1 | −1.0000 |
| S12 | Aspheric | 4.6770 | 1.0058 | | | | −1.0000 |
| S13 | Aspheric | −4.0370 | 0.4493 | −4.14 | 1.54 | 55.7 | −1.0000 |
| S14 | Aspheric | 5.1307 | 0.2677 | | | | 0.0389 |
| S15 | Spherical | Infinity | 0.2100 | | 1.52 | 64.2 | |
| S16 | Spherical | Infinity | 0.3220 | | | | |
| S17 | Spherical | Infinity | | | | | |

As shown in Table 11, in Embodiment 4, f is a total effective focal length of the optical imaging lens assembly, and f=5.16 mm, TTL is a distance from the object-side surface S1 of the first lens E1 to the imaging surface S17 on the optical axis, and TTL=6.51 mm, ImgH is a half of a diagonal length of an effective pixel region on the imaging surface S17, and ImgH=5.73 mm. The parameters of each relational expression are as explained in Embodiment 1 t, and the numerical values of each relational expression are listed in the following table.

TABLE 11

Embodiment 4

| | | | |
|---|---|---|---|
| f(mm) | 5.16 | TTL(mm) | 6.51 |
| ImgH(mm) | 5.73 | TTL/I mg H | 1.14 |
| F × tan(½FOV)(mm) | 5.57 | f/EPD | 1.87 |
| f6/(R11 + R12) | 0.92 | f4/f1 | 3.00 |
| (f3 + f7)/(f3 − f7) | 1.26 | (R3 + R4)/(R1 + R2) | 1 53 |
| R9/R10 | 0.95 | (R13 + R14)/CT7 | 2.43 |
| T67/CT6 | 2.45 | f12/(CT1 + CT2) | 8.48 |
| (SAG51 + SAG52)/(SAG41 + SAG42) | 2.10 | SAG71/SAG61 | 1.99 |

In Embodiment 4, both of the object-side surface and the image-side surface of any one of the first lens E1 to the seventh lens E7 are aspheric surfaces, and Table 12 shows high-order coefficients A4, A6, A8, A10, A12, A14, A16, A18, A20, A22, A24, A26, A28 and A30 that can be used for each aspheric mirror surface S1-S14 in Embodiment 4.

TABLE 12

| Surface number | | | | | | | |
|---|---|---|---|---|---|---|---|
| | A4 | A6 | A8 | A10 | A12 | A14 | A16 |
| S1 | −2.5587E−03 | 1.4338E−02 | −2.3514E−02 | 1.8892E−02 | −9.5080E−04 | −1.0097E−02 | 7.7134E−03 |
| S2 | −4.1850E−03 | 5.9643E−03 | −5.3200E−02 | 1.3564E−01 | −1.8382E−01 | 1.4689E−01 | −6.8750E−02 |
| S3 | −1.2373E−02 | −1.1530E−02 | 3.5249E−02 | −4.4287E−02 | 3.8562E−02 | −2.0650E−02 | 6.0764E−03 |
| S4 | −4.0037E−03 | −1.6668E−02 | 9.6016E−02 | −2.1444E−01 | 2.9901E−01 | −2.5476E−01 | 1.2877E−01 |
| S5 | −2.0398E−02 | −3.0271E−03 | −2.3645E−03 | 5.1980E−03 | −1.1270E−02 | 1.3458E−02 | −8.8512E−03 |
| S6 | −3.4476E−02 | 1.8007E−02 | −2.0209E−02 | 1.2823E−02 | −4.8609E−03 | 1.8755E−04 | 7.8413E−04 |
| S7 | −4.0984E−02 | 2.8493E−02 | −2.6282E−02 | 2.0169E−02 | −1.2053E−02 | 4.9947E−03 | −1.2589E−03 |
| S8 | −4.8096E−02 | 3.2419E−02 | −3.5347E−02 | 2.7071E−02 | −1.3908E−02 | 4.6615E−03 | −9.6050E−04 |
| S9 | −6.8594E−02 | 6.7652E−02 | −5.1174E−02 | 2.7931E−02 | −1.0752E−02 | 2.6828E−03 | −4.0668E−04 |
| S10 | −1.4816E−01 | 1.1839E−01 | −7.8797E−02 | 4.1800E−02 | −1.6153E−02 | 4.2601E−03 | −7.4865E−04 |
| S11 | −6.3609E−02 | 2.7576E−02 | −1.8466E−02 | 7.8853E−03 | −2.4171E−03 | 5.3400E−04 | −8.2177E−05 |
| S12 | 3.1609E−02 | −2.1853E−02 | 5.1998E−03 | −1.0093E−03 | 1.9012E−04 | −2.7279E−05 | 2.4310E−06 |
| S13 | −4.5560E−02 | 1.8785E−02 | −3.3539E−03 | 3.8264E−04 | −3.1326E−05 | 1.7107E−06 | −3.2131E−08 |
| S14 | −4.8602E−02 | 1.2673E−02 | −1.8648E−03 | 5.8670E−06 | 5.2336E−05 | −1.0792E−05 | 1.1831E−06 |

| Surface number | | | | | | | |
|---|---|---|---|---|---|---|---|
| | A18 | A20 | A22 | A24 | A26 | A28 | A30 |
| S1 | −2.4053E−03 | 2.8030E−04 | 0.0000E+00 | 0.0000E+00 | 0.0000E+00 | 0.0000E+00 | 0.0000E+00 |
| S2 | 1.7344E−02 | −1.8167E−03 | 0.0000E+00 | 0.0000E+00 | 0.0000E+00 | 0.0000E+00 | 0.0000E+00 |
| S3 | −8.2907E−04 | 3.1044E−05 | 0.0000E+00 | 0.0000E+00 | 0.0000E+00 | 0.0000E+00 | 0.0000E+00 |
| S4 | −3.5424E−02 | 4.0853E−03 | 0.0000E+00 | 0.0000E+00 | 0.0000E+00 | 0.0000E+00 | 0.0000E+00 |
| S5 | 3.0317E−03 | −4.1291E−04 | 0.0000E+00 | 0.0000E+00 | 0.0000E+00 | 0.0000E+00 | 0.0000E+00 |
| S6 | −3.2022E−04 | 4.3300E−05 | 0.0000E+00 | 0.0000E+00 | 0.0000E+00 | 0.0000E+00 | 0.0000E+00 |
| S7 | 1.7241E−04 | −9.9287E−06 | 0.0000E+00 | 0.0000E+00 | 0.0000E+00 | 0.0000E+00 | 0.0000E+00 |
| S8 | 1.1015E−04 | −5.3823E−06 | 0.0000E+00 | 0.0000E+00 | 0.0000E+00 | 0.0000E+00 | 0.0000E+00 |
| S9 | 3.3143E−05 | −9.5589E−07 | −1.7881E−08 | 0.0000E+00 | 0.0000E+00 | 0.0000E+00 | 0.0000E+00 |
| S10 | 8.6070E−05 | −6.2137E−06 | 2.5570E−07 | −4.6635E−09 | 1.3483E−11 | −5.3041E−13 | 0.0000E+00 |
| S11 | 8.6076E−06 | −5.9824E−07 | 2.6222E−08 | −6.4341E−10 | 6.0149E−12 | 2.7477E−14 | 0.0000E+00 |
| S12 | −1.1069E−07 | 3.3236E−10 | 2.1427E−10 | −9.3167E−12 | 1.2906E−13 | −6.3194E−17 | 4.8297E−18 |
| S13 | −3.5437E−09 | 3.5620E−10 | −1.6337E−11 | 4.7001E−13 | −9.7143E−15 | 1.4797E−16 | −1.2169E−18 |
| S14 | −8.1083E−08 | 3.5732E−09 | −9.8533E−11 | 1.5489E−12 | −1.0601E−14 | 0.0000E+00 | 0.0000E+00 |

Figure 8A:
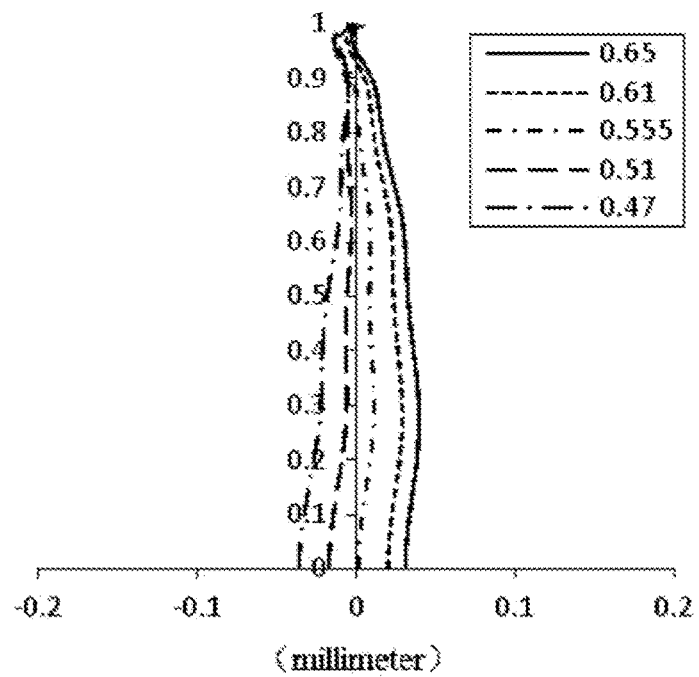
FIGS. 8a-8d show a longitudinal aberration curve, an astigmatism curve, a distortion curve and a lateral color curve of an optical imaging lens assembly according to Embodiment 4 of the disclosure respectively.
Figure 8B:
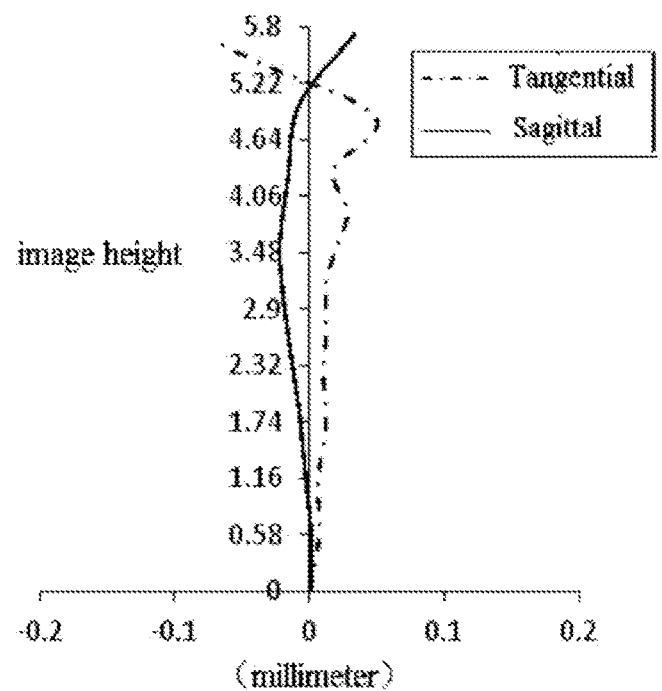
Figure 8C:
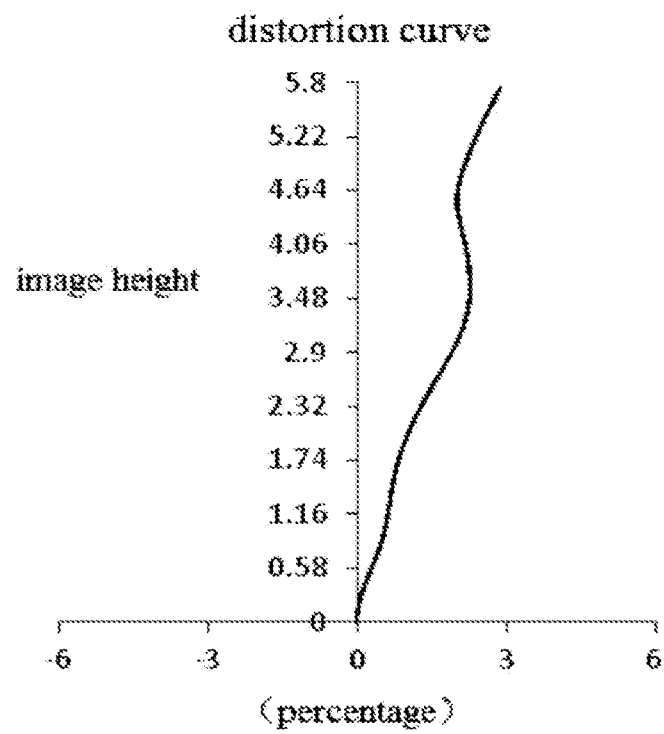
Figure 8D:
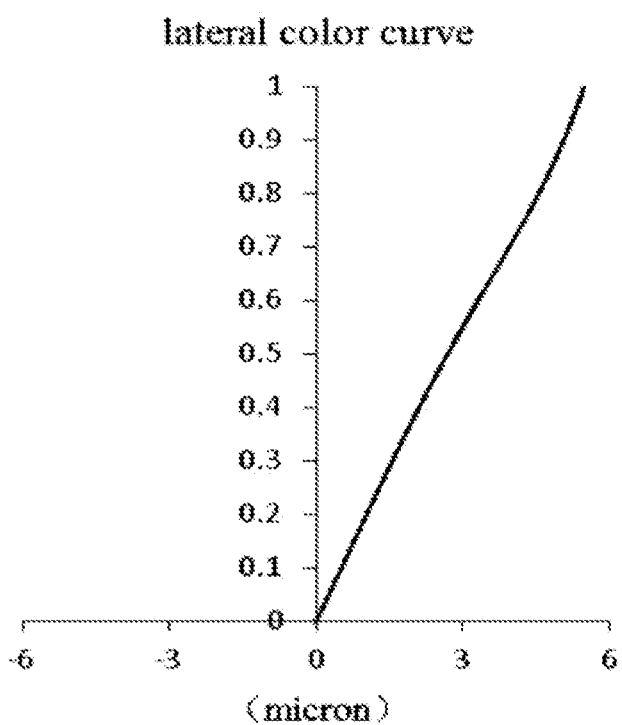

FIG. 8a shows a longitudinal aberration curve of the optical imaging lens assembly according to Embodiment 4, to represent deviations of a convergence focal point after light with different wavelengths passes through the lens. FIG. 8b shows an astigmatism curve of the optical imaging lens assembly according to Embodiment 4, to represent a tangential image surface curvature and a sagittal image surface curvature. FIG. 8c shows a distortion curve of the optical imaging lens assembly according to Embodiment 4, to represent distortion values corresponding to different image heights. FIG. 8d shows a lateral color curve of the optical imaging lens assembly according to Embodiment 4, to represent deviations of different image heights on the imaging surface after the light passes through the lens.

According to FIGS. 8a-8d, it can be seen that the optical imaging lens assembly given in Embodiment 4 may achieve good imaging quality.

Embodiment 5

Figure 9:
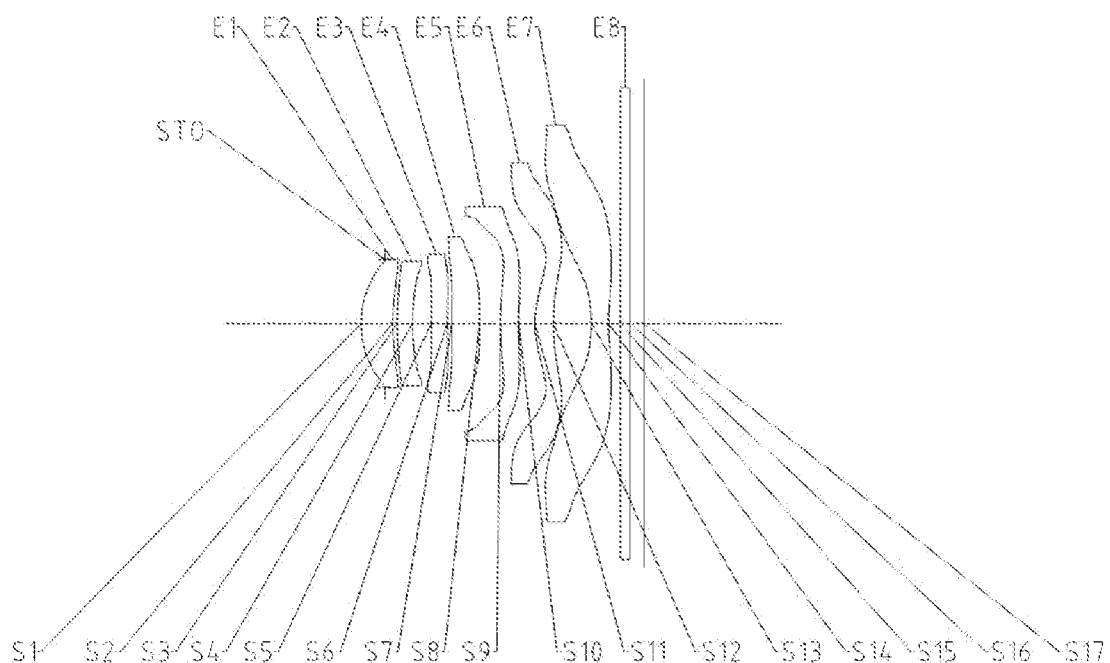
FIG. 9 shows a structural schematic diagram of the lens group of an optical imaging lens assembly according to Embodiment 5 of the disclosure.

FIG. 9 shows a structural schematic diagram of the lens group of the optical imaging lens assembly according to Embodiment 5 of the disclosure, the optical imaging lens assembly sequentially includes from an object side to an image-side surface along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a convex surface. The fifth lens E5 has a positive refractive power, an object-side surface S9 thereof is a convex surface, and an image-side surface S10 thereof is a concave surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a concave surface. The optical filter E8 has an object-side surface S15 and an image-side surface S16. Light from an object passes through each of the surfaces S1 to S16 sequentially and is finally imaged on the imaging surface S17.

As shown in Table 13, it is a basic parameter table of the optical imaging lens assembly of Embodiment 5, wherein the units of curvature radius, thickness and focal length are all millimeters (mm).

TABLE 13

| Surface number | Surface type | Curvature radius | Thickness/ distance | Focal length | Refractive index | Abbe number | Conic coefficient |
|---|---|---|---|---|---|---|---|
| OBJ | Spherical | Infinity | Infinity | | | | |
| STO | Spherical | Infinity | −0.5204 | | | | |
| S1 | Aspheric | 2.1026 | 0.6887 | 7.11 | 1.54 | 56.1 | −0.0870 |
| S2 | Aspheric | 4.0586 | 0.1000 | | | | −17.2239 |
| S3 | Aspheric | 5.7667 | 0.3400 | 290709.12 | 1.67 | 19.2 | −36.4735 |
| S4 | Aspheric | 5.6295 | 0.4097 | | | | 1.7566 |
| S5 | Aspheric | 29.1119 | 0.3500 | −33.15 | 1.67 | 19.2 | −83.7050 |
| S6 | Aspheric | 12.6180 | 0.1000 | | | | 0.0000 |
| S7 | Aspheric | 20.1862 | 0.6095 | 18.84 | 1.54 | 56.1 | 0.0000 |
| S8 | Aspheric | −20.7547 | 0.4513 | | | | 3.9044 |
| S9 | Aspheric | 5.1229 | 0.4000 | 177.28 | 1.57 | 37.3 | −7.5826 |
| S10 | Aspheric | 5.2432 | 0.3580 | | | | −1.0000 |
| S11 | Aspheric | 2.0764 | 0.4000 | 6.60 | 1.54 | 56.1 | −1.0000 |
| S12 | Aspheric | 4.5688 | 0.8390 | | | | −1.0000 |
| S13 | Aspheric | −3.8702 | 0.3763 | −3.84 | 1.54 | 55.7 | −1.0000 |
| S14 | Aspheric | 4.5563 | 0.2597 | | | | 0.0392 |
| S15 | Spherical | Infinity | 0.2100 | | 1.52 | 64.2 | |
| S16 | Spherical | Infinity | 0.3081 | | | | |
| S17 | Spherical | Infinity | | | | | |

As shown in Table 14, in Embodiment 5, f is a total effective focal length of the optical imaging lens assembly, and f=4.97 mm, TTL is a distance from the object-side surface S1 of the first lens E1 to the imaging surface S17 on the optical axis, and TTL=6.20 mm, ImgH is a half of a diagonal length of an effective pixel region on the imaging surface S17, and ImgH=5.12 mm. The parameters of each relational expression are as explained in Embodiment 1 t, and the numerical values of each relational expression are listed in the following table.

TABLE 14

| Embodiment 5 | | | |
|---|---|---|---|
| f(mm) | 4.97 | TTL(mm) | 6.20 |
| ImgH(mm) | 5.12 | TTL/ImgH | 1.21 |

TABLE 14-continued

| Embodiment 5 | | | |
|---|---|---|---|
| F × tan(½FOV)(mm) | 4.95 | f/EPD | 1.78 |
| f6/(R11 + R12) | 0.99 | f4/f1 | 2.65 |
| (f3 + f7)/(f3 − f7) | 1.26 | (R3 + R4)/(R1 + R2) | 1.85 |
| R9/R10 | 0.98 | (R13 + R14)/CT7 | 1.82 |
| T67/CT6 | 2.10 | f12/(CT1 + CT2) | 6.74 |
| (SAGS1 + SAG52)/(SAG41 + SAG42) | 2.34 | SAG71/SAG61 | 1.90 |

In Embodiment 5, both of the object-side surface and the image-side surface of any one of the first lens E1 to the seventh lens E7 are aspheric surfaces, and Table 15 shows high-order coefficients A5, A6, A8, A10, A12, A14, A16, A18, A20, A22, A24, A26, A28 and A30 that can be used for each aspheric mirror surface S1-S14 in Embodiment 4.

TABLE 15

| | Surface number | | | | | | |
|---|---|---|---|---|---|---|---|
| | A4 | A6 | A8 | A10 | A12 | A14 | A16 |
| S1 | 9.7633E−04 | 1.0723E−02 | −3.2966E−02 | 6.1804E−02 | −6.7627E−02 | 4.4989E−02 | −1.8036E−02 |
| S2 | 1.3464E−03 | −3.1836E−02 | 5.3645E−02 | −9.1283E−02 | 1.1159E−01 | −8.2600E−02 | 3.5053E−02 |
| S3 | −1.6439E−02 | −8.6069E−03 | 1.0610E−02 | −7.9189E−03 | 2.5454E−02 | −3.0987E−02 | 1.6686E−02 |
| S4 | −6.4462E−03 | −1.1194E−02 | 8.4623E−02 | −1.9081E−01 | 3.0084E−01 | −2.9968E−01 | 1.7944E−01 |
| S5 | −3.6445E−02 | 5.6845E−02 | −2.1122E−01 | 4.5846E−01 | −6.3091E−01 | 5.4149E−01 | −2.8003E−01 |
| S6 | −4.5817E−02 | 5.0120E−02 | −9.5431E−02 | 1.2428E−01 | −1.1113E−01 | 6.4549E−02 | −2.3009E−02 |
| S7 | −4.8159E−02 | 4.1823E−02 | −6.2023E−02 | 6.9203E−02 | −5.3173E−02 | 2.6226E−02 | −7.6113E−03 |
| S8 | −4.5374E−02 | 1.3091E−02 | −6.1926E−03 | −6.2574E−03 | 1.0278E−02 | −6.1859E−03 | 1.9377E−03 |
| S9 | −6.8354E−02 | 8.2333E−02 | −8.3281E−02 | 5.8165E−02 | −2.8080E−02 | 8.7210E−03 | −1.6448E−03 |
| S10 | −1.4225E−01 | 1.3278E−01 | −1.0138E−01 | 5.8857E−02 | −2.4680E−02 | 7.0359E−03 | −1.3175E−03 |
| S11 | −8.7985E−02 | 4.1615E−02 | −2.9503E−02 | 1.5031E−02 | −6.1451E−03 | 1.8523E−03 | −3.7927E−04 |
| S12 | 6.9188E−03 | −1.8524E−02 | 1.1146E−02 | −6.3274E−03 | 2.4064E−03 | −5.7348E−04 | 8.810E−05 |

TABLE 15-continued

| | | | | | | | |
|---|---|---|---|---|---|---|---|
| S13 | −9.1716E−02 | 5.4465E−02 | −1.7895E−02 | 4.6786E−03 | −9.7697E−04 | 1.5033E−04 | −1.6278E−05 |
| S14 | −8.5374E−02 | 3.6449E−02 | −1.0610E−02 | 1.9843E−03 | −2.3385E−04 | 1.4836E−05 | −1.0971E−10 |

| | Surface number | | | | | | |
|---|---|---|---|---|---|---|---|
| | A18 | A20 | A11 | A24 | A26 | A28 | A30 |
| S1 | 4.0425E−03 | −4.0128E−04 | 0.0000E+00 | 0.0000E+00 | 0.0000E+00 | 0.0000E+00 | 0.0000E+00 |
| S2 | −7.7907E−03 | 6.8314E−04 | 0.0000E+00 | 0.0000E+00 | 0.0000E+00 | 0.0000E+00 | 0.0000E+00 |
| S3 | −4.0063E−03 | 3.2227E−04 | 0.0000E+00 | 0.0000E+00 | 0.0000E+00 | 0.0000E+00 | 0.0000E+00 |
| S4 | −5.8995E−02 | 8.2662E−03 | 0.0000E+00 | 0.0000E+00 | 0.0000E+00 | 0.0000E+00 | 0.0000E+00 |
| S5 | 7.9238E−02 | −9.3080E−03 | 0.0000E+00 | 0.0000E+00 | 0.0000E+00 | 0.0000E+00 | 0.0000E+00 |
| S6 | 4.5563E−03 | −3.7487E−04 | 0.0000E+00 | 0.0000E+00 | 0.0000E+00 | 0.0000E+00 | 0.0000E+00 |
| S7 | 1.1873E−03 | −7.8649E−05 | 0.0000E+00 | 0.0000E+00 | 0.0000E+00 | 0.0000E+00 | 0.0000E+00 |
| S8 | −2.9913E−04 | 1.7252E−05 | 0.0000E+00 | 0.0000E+00 | 0.0000E+00 | 0.0000E+00 | 0.0000E+00 |
| S9 | 1.6799E−04 | −6.3509E−06 | −1.0982E−07 | 0.0000E+00 | 0.0000E+00 | 0.0000E+00 | 0.0000E+00 |
| S10 | 1.5710E−04 | −1.1206E−05 | 4.0111E−07 | −1.7381E−09 | −3.0770E−10 | 7.8134E−12 | 0.0000E+00 |
| S11 | 5.1439E−05 | −4.5415E−06 | 2.4965E−07 | −7.5941E−09 | 8.4967E−11 | 6.0484E−13 | 0.0000E+00 |
| S12 | −8.9068E−06 | 5.9018E−07 | −2.4719E−08 | 6.0112E−10 | −7.2618E−12 | 5.0969E−14 | −8.6322E−16 |
| S13 | 1.2155E−06 | −6.1290E−08 | 2.0094E−09 | −4.0203E−11 | 4.6614E−13 | −4.3003E−15 | 4.8429E−17 |
| S14 | −8.7061E−08 | 7.7566E−09 | −3.3983E−10 | 7.7982E−12 | −7.4864E−14 | 0.0000E+00 | 0.0000E+00 |

Figure 10A:
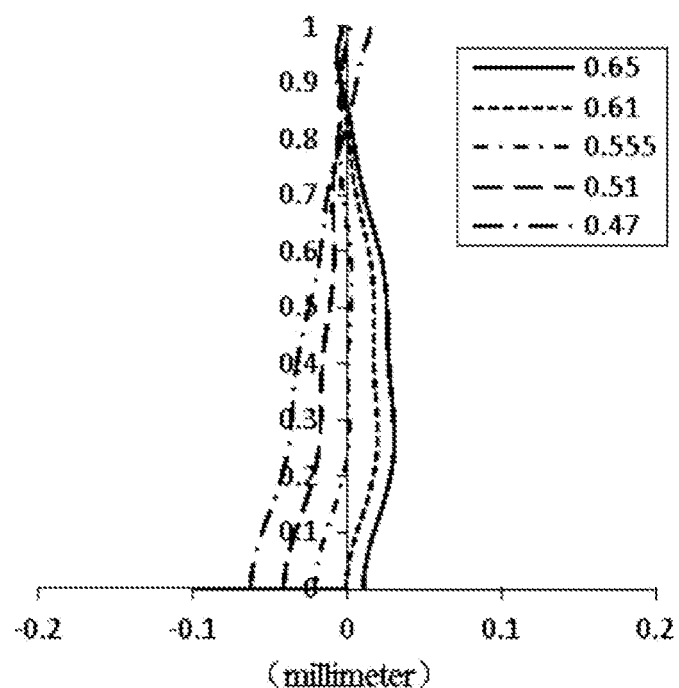
FIGS. 10a-10d show a longitudinal aberration curve, an astigmatism curve, a distortion curve and a lateral color curve of an optical imaging lens assembly according to Embodiment 5 of the disclosure respectively.
Figure 10B:
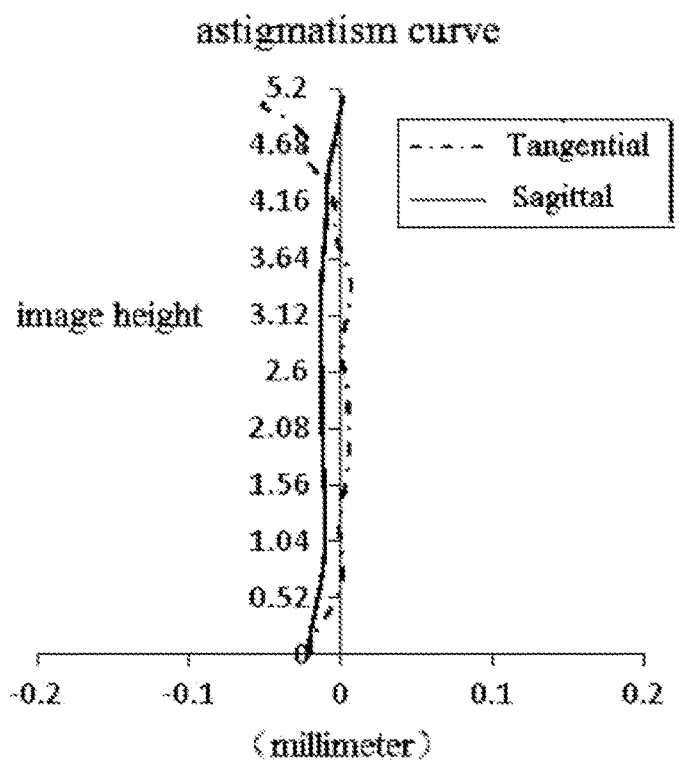
Figure 10C:
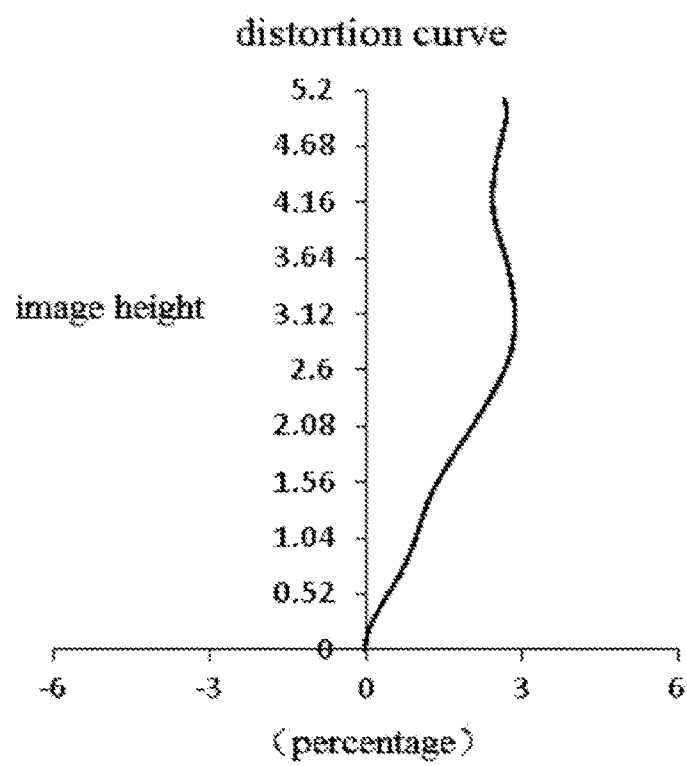
Figure 10D:
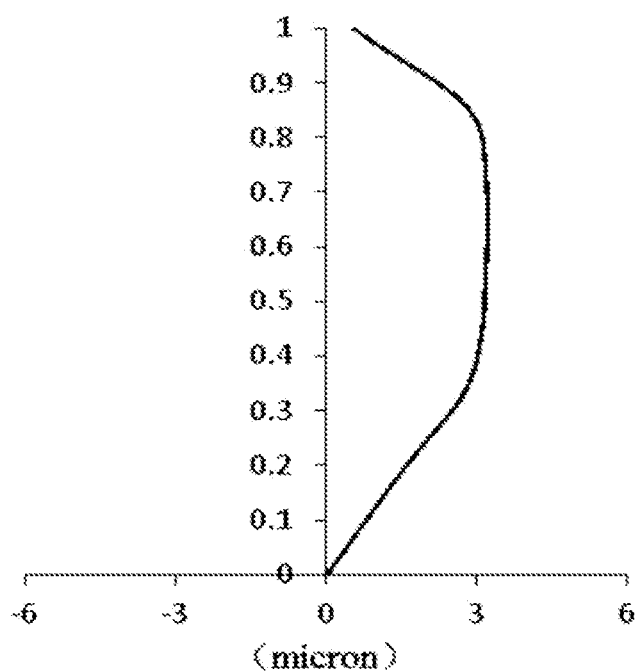

FIG. 10a shows a longitudinal aberration curve of the optical imaging lens assembly according to Embodiment 5, to represent deviations of a convergence focal point after light with different wavelengths passes through the lens. FIG. 10b shows an astigmatism curve of the optical imaging lens assembly according to Embodiment 5, to represent a tangential image surface curvature and a sagittal image surface curvature. FIG. 10c shows a distortion curve of the optical imaging lens assembly according to Embodiment 5, to represent distortion values corresponding to different image heights. FIG. 10d shows a lateral color curve of the optical imaging lens assembly according to Embodiment 5, to represent deviations of different image heights on the imaging surface after the light passes through the lens. According to FIGS. 10a-10d, it can be seen that the optical imaging lens assembly given in Embodiment 5 may achieve good imaging quality.

What has been described above is only the preferred embodiment of the disclosure, and it is not intended to limit the disclosure. Any modification, improvement, equivalent replacement, etc. made within the spirit and principle of the disclosure should be included in the scope of protection of the disclosure.

What is claimed is:

1. An optical imaging lens assembly, sequentially comprising from an object side to an image side along an optical axis:
   a first lens with a positive refractive power;
   a second lens with a refractive power;
   a third lens with a refractive power;
   a fourth lens with a refractive power;
   a fifth lens with a refractive power, an object-side surface thereof is a convex surface, and an image-side surface thereof is a concave surface;
   a sixth lens with a positive refractive power, an object-side surface thereof is a convex surface, and an image-side surface thereof is a concave surface;
   a seventh lens with a negative refractive power;
   wherein TTL is an on-axis distance from an object-side surface of the first lens to an imaging surface, and ImgH is a half of a diagonal length of an effective pixel region on the imaging surface, and TTL and ImgH satisfy: TTL/ImgH<1.25.

2. The optical imaging lens assembly according to claim 1, wherein an effective focal length f of the optical imaging lens assembly and a maximum field of view FOV of the optical imaging lens assembly satisfy: 4.8 mm<f×tan(½FOV)<6.5 mm.

3. The optical imaging lens assembly according to claim 1, wherein an effective focal length f of the optical imaging lens assembly and an Entrance Pupil Diameter (EPD) of the optical imaging lens assembly satisfy: f/EPD<1.9.

4. The optical imaging lens assembly according to claim 1, wherein an effective focal length f6 of the sixth lens, a curvature radius R12 of the image-side surface of the sixth lens and a curvature radius R11 of the object-side surface of the sixth lens satisfy: 0.7<f6/(R11+R12)<1.5.

5. The optical imaging lens assembly according to claim 1, wherein an effective focal length f4 of the fourth lens and an effective focal length f1 of the first lens satisfy: 2.2<f4/f1<3.2.

6. The optical imaging lens assembly according to claim 1, wherein an effective focal length f3 of the third lens and an effective focal length f7 of the seventh lens satisfy: 1.0<(f3+f7)/(f3−f7)<1.5.

7. The optical imaging lens assembly according to claim 1, wherein a curvature radius R4 of an image-side surface of the second lens, a curvature radius R3 of an object-side surface of the second lens, a curvature radius R2 of an image-side surface of the first lens and a curvature radius R1 of an object-side surface of the first lens satisfy: 1.5<(R3+R4)/(R1+R2)<2.0.

8. The optical imaging lens assembly according to claim 1, wherein a curvature radius R10 of the image-side surface of the fifth lens and a curvature radius R9 of the object-side surface of the fifth lens satisfy: 0.8<R9/R10<1.3.

9. The optical imaging lens assembly according to claim 1, wherein a curvature radius R14 of an image-side surface of the seventh lens, a curvature radius R13 of an object-side surface of the seventh lens and a center thickness CT7 of the seventh lens on the optical axis satisfy: 1.7<(R13+R14)/CT7<3.4.

10. The optical imaging lens assembly according to claim 1, wherein an air space T67 between the sixth lens and the seventh lens on the optical axis, and a center thickness CT6 of the sixth lens on the optical axis satisfy: 2.0<T67/CT6<2.8.

11. The optical imaging lens assembly according to claim 1, wherein a combined focal length f12 of the first lens and the second lens, a center thickness CT1 of the first lens on the optical axis and a center thickness CT2 of the second lens on the optical axis satisfy: $6.6<f12/(CT1+CT2)<8.6$.

12. The optical imaging lens assembly according to claim 1, wherein SAG51 is an on-axis distance between an intersection point of the object-side surface of the fifth lens and the optical axis and an effective radius vertex of the object-side surface of the fifth lens, SAG52 is an on-axis distance between an intersection point of the image-side surface of the fifth lens and the optical axis and an effective radius vertex of the image-side surface of the fifth lens, SAG41 is an on-axis distance between an intersection point of an object-side surface of the fourth lens and the optical axis and an effective radius vertex of the object-side surface of the fourth lens, and SAG42 is an on-axis distance between an intersection point of an image-side surface of the fourth lens and the optical axis and an effective radius vertex of the image-side surface of the fourth lens, and SAG51, SAG52, SAG41 and SAG42 satisfy: $1.7<(SAG51+SAG52)/(SAG41+SAG42)<2.5$.

13. The optical imaging lens assembly according to claim 1, wherein SAG71 is an on-axis distance between an intersection point of an object-side surface of the seventh lens and the optical axis and an effective radius vertex of the object-side surface of the seventh lens, SAG61 is an on-axis distance between an intersection point of the object-side surface of the sixth lens and the optical axis and an effective radius vertex of the object-side surface of the sixth lens, and SAG71 and SAG61 satisfy: $1.6<SAG71/SAG61<2.3$.

14. An optical imaging lens assembly, sequentially comprising from an object side to an image side along an optical axis:
   a first lens with a positive refractive power;
   a second lens with a refractive power;
   a third lens with a refractive power;
   a fourth lens with a refractive power;
   a fifth lens with a refractive power, an object-side surface thereof is a convex surface, and an image-side surface thereof is a concave surface;
   a sixth lens with a positive refractive power, an object-side surface thereof is a convex surface, and an image-side surface thereof is a concave surface;
   a seventh lens with a negative refractive power;
   wherein an effective focal length f of the optical imaging lens assembly and a maximum field of view FOV of the optical imaging lens assembly satisfy: $4.8\ mm<f\times\tan(½FOV)<6.5\ mm$.

15. The optical imaging lens assembly according to claim 14, wherein TTL is a distance from an object-side surface of the first lens to an imaging surface on the optical axis, ImgH is a half of a diagonal length of an effective pixel region on the imaging surface, and TTL and ImgH satisfy: $TTL/ImgH<1.25$.

16. The optical imaging lens assembly according to claim 14, wherein an effective focal length f of the optical imaging lens assembly and an Entrance Pupil Diameter (EPD) of the optical imaging lens assembly satisfy: $f/EPD<1.9$.

17. The optical imaging lens assembly according to claim 14, wherein an effective focal length f6 of the sixth lens, a curvature radius R12 of the image-side surface of the sixth lens and a curvature radius R11 of the object-side surface of the sixth lens satisfy: $0.7<f6/(R11+R12)<1.5$.

18. The optical imaging lens assembly according to claim 14, wherein an effective focal length f4 of the fourth lens and an effective focal length f1 of the first lens satisfy: $2.2<f4/f1<3.2$.

19. The optical imaging lens assembly according to claim 14, wherein an effective focal length f3 of the third lens and an effective focal length f7 of the seventh lens satisfy: $1.0<(f3+f7)/(f3-f7)<1.5$.

20. The optical imaging lens assembly according to claim 14, wherein a curvature radius R4 of an image-side surface of the second lens, a curvature radius R3 of an object-side surface of the second lens, a curvature radius R2 of an image-side surface of the first lens and a curvature radius R1 of an object-side surface of the first lens satisfy: $1.5<(R3+R4)/(R1+R2)<2.0$.

* * * * *